US008902195B2

(12) United States Patent
McGibney et al.

(10) Patent No.: US 8,902,195 B2
(45) Date of Patent: Dec. 2, 2014

(54) INTERACTIVE INPUT SYSTEM WITH IMPROVED SIGNAL-TO-NOISE RATIO (SNR) AND IMAGE CAPTURE METHOD

(75) Inventors: Grant McGibney, Calgary (CA); Gerald Morrison, Calgary (CA); Charles Ung, Calgary (CA); Trevor Akitt, Calgary (CA); Ed Tse, Calgary (CA); Erik Benner, Calgary (CA); Jamie Duncalf, Calgary (CA)

(73) Assignee: SMART Technologies ULC (CA)

( * ) Notice: Subject to any disclaimer, the term of this patent is extended or adjusted under 35 U.S.C. 154(b) by 1037 days.

(21) Appl. No.: 12/873,998

(22) Filed: Sep. 1, 2010

(65) Prior Publication Data

US 2011/0050650 A1    Mar. 3, 2011

Related U.S. Application Data

(60) Provisional application No. 61/239,057, filed on Sep. 1, 2009.

(51) Int. Cl.
G06F 3/042 (2006.01)
G06F 3/038 (2013.01)
G06F 3/041 (2006.01)

(52) U.S. Cl.
CPC ............ *G06F 3/0428* (2013.01); *G06F 3/0386* (2013.01); *G06F 3/0425* (2013.01); *G06F 3/0416* (2013.01); *G06F 2203/04109* (2013.01)
USPC ........... 345/175; 348/345; 351/210; 250/224; 385/13

(58) Field of Classification Search
USPC ....................................................... 345/175
See application file for complete search history.

(56) References Cited

U.S. PATENT DOCUMENTS

| 3,364,881 A | 1/1968 | Kool |
| 4,372,631 A | 2/1983 | Leon |

(Continued)

FOREIGN PATENT DOCUMENTS

| EP | 1315071 | 5/2003 |
| EP | 1876517 | 1/2008 |

(Continued)

OTHER PUBLICATIONS

Press Release Contact: Patricia Corsaut, "Intuilab introduces IntuiFace, An interactive table and its application platform", Nov. 30, 2007, Intuilab Press Release.

(Continued)

*Primary Examiner* — Gerald Johnson
(74) *Attorney, Agent, or Firm* — Katten Muchin Rosenman LLP

(57) ABSTRACT

An input panel for an interactive input system comprises an optical waveguide; a first radiation source directing radiation into said optical waveguide, said radiation undergoing total internal reflection within said optical waveguide; a diffusion layer adjacent to and on one side of the optical waveguide, totally internally reflected light being frustrated and escaping the optical waveguide in response to pointer contacts on the diffusion layer; a second radiation source directing radiation towards another side of the optical waveguide that is opposite the one side; and at least one imaging device having a field of view looking at the optical waveguide and capturing image frames, wherein said first and second radiation sources are turned on and off in succession and wherein said first radiation source is turned off when said second radiation source is on and wherein said first radiation source is turned on when said second radiation source is off.

24 Claims, 17 Drawing Sheets

(56) References Cited

U.S. PATENT DOCUMENTS

| | | | |
|---|---|---|---|
| D270,788 S | 10/1983 | Umanoff et al. |
| D286,831 S | 11/1986 | Matyear |
| D290,199 S | 6/1987 | Hampshire |
| 4,710,760 A | 12/1987 | Kasday |
| D306,105 S | 2/1990 | Newhouse |
| D312,928 S | 12/1990 | Scheffers |
| D318,660 S | 7/1991 | Weber |
| D353,368 S | 12/1994 | Poulos |
| 5,448,263 A | 9/1995 | Martin |
| D372,601 S | 8/1996 | Roberts et al. |
| 6,061,177 A | 5/2000 | Fujimoto |
| 6,141,000 A | 10/2000 | Martin |
| 6,337,681 B1 | 1/2002 | Martin |
| 6,339,748 B1 | 1/2002 | Hiramatsu |
| D462,346 S | 9/2002 | Abboud |
| D462,678 S | 9/2002 | Abboud |
| 6,545,670 B1 | 4/2003 | Pryor |
| 6,608,636 B1 | 8/2003 | Roseman |
| 6,738,051 B2 | 5/2004 | Boyd et al. |
| 6,747,636 B2 | 6/2004 | Martin |
| 6,803,906 B1 | 10/2004 | Morrison et al. |
| 6,867,886 B2 | 3/2005 | Lassen |
| 6,972,401 B2 | 12/2005 | Akitt et al. |
| 7,002,555 B1 | 2/2006 | Jacobsen et al. |
| 7,129,927 B2 | 10/2006 | Mattsson |
| 7,176,904 B2 | 2/2007 | Satoh |
| 7,187,489 B2 | 3/2007 | Miles |
| 7,232,986 B2 | 6/2007 | Worthington et al. |
| 7,236,162 B2 | 6/2007 | Morrison et al. |
| 7,274,356 B2 | 9/2007 | Ung et al. |
| 7,327,376 B2 | 2/2008 | Shen et al. |
| 7,372,456 B2 | 5/2008 | McLintock |
| D571,365 S | 6/2008 | Morelock et al. |
| D571,803 S | 6/2008 | Morelock et al. |
| D571,804 S | 6/2008 | Morelock et al. |
| 7,403,837 B2 | 7/2008 | Graiger et al. |
| 7,411,575 B2 | 8/2008 | Hill et al. |
| 7,515,143 B2 | 4/2009 | Keam |
| 7,559,664 B1 | 7/2009 | Walleman et al. |
| 7,593,593 B2 | 9/2009 | Wilson |
| 7,630,002 B2 | 12/2009 | Jenkins |
| 7,710,391 B2 | 5/2010 | Bell et al. |
| 8,115,855 B2 * | 2/2012 | Ollila et al. | 348/345 |
| 2001/0012001 A1 | 8/2001 | Rekimoto |
| 2003/0137494 A1 | 7/2003 | Tulbert |
| 2004/0032401 A1 | 2/2004 | Nakazawa et al. |
| 2004/0149892 A1 | 8/2004 | Akitt et al. |
| 2004/0233235 A1 | 11/2004 | Rubin et al. |
| 2005/0104860 A1 | 5/2005 | McCreary et al. |
| 2005/0110964 A1 | 5/2005 | Bell |
| 2005/0122308 A1 | 6/2005 | Bell |
| 2005/0162381 A1 | 7/2005 | Bell |
| 2005/0183035 A1 | 8/2005 | Ringel et al. |
| 2005/0243070 A1 | 11/2005 | Ung et al. |
| 2006/0044282 A1 | 3/2006 | Pinhanez et al. |
| 2006/0114244 A1 | 6/2006 | Saxena et al. |
| 2006/0158425 A1 | 7/2006 | Andrews et al. |
| 2006/0279558 A1 | 12/2006 | van Delden et al. |
| 2007/0046775 A1 | 3/2007 | Ferren et al. |
| 2007/0273842 A1 | 11/2007 | Morrison et al. |
| 2008/0029691 A1 | 2/2008 | Han |
| 2008/0084539 A1 | 4/2008 | Daniel |
| 2008/0150890 A1 | 6/2008 | Bell |
| 2008/0150913 A1 | 6/2008 | Bell |
| 2008/0179507 A2 | 7/2008 | Han |
| 2008/0234032 A1 | 9/2008 | de Courssou et al. |
| 2008/0278460 A1 | 11/2008 | Arnett et al. |
| 2009/0027357 A1 | 1/2009 | Morrison et al. |
| 2009/0085881 A1 | 4/2009 | Keam |
| 2009/0103853 A1 | 4/2009 | Daniel |
| 2009/0109180 A1 | 4/2009 | Do et al. |
| 2009/0128499 A1 | 5/2009 | Izadi |
| 2009/0146972 A1 | 6/2009 | Morrison et al. |
| 2009/0153519 A1 | 6/2009 | Suarez Rovere |
| 2010/0001963 A1 | 1/2010 | Doray et al. |
| 2010/0020025 A1 | 1/2010 | Lemort et al. |
| 2010/0073326 A1 | 3/2010 | Keam |
| 2010/0079385 A1 | 4/2010 | Holmgren |
| 2010/0079409 A1 | 4/2010 | Sirotich et al. |
| 2010/0079493 A1 | 4/2010 | Tse et al. |
| 2010/0083109 A1 | 4/2010 | Tse et al. |
| 2010/0177049 A1 | 7/2010 | Levy |
| 2011/0163996 A1 * | 7/2011 | Wassvik et al. | 345/175 |

FOREIGN PATENT DOCUMENTS

| | | |
|---|---|---|
| GB | 2404127 | 1/2005 |
| JP | 08-205113 | 8/1996 |
| WO | WO 2004/090706 | 10/2004 |
| WO | WO 2005/034027 | 4/2005 |
| WO | WO 2006/095320 | 9/2006 |
| WO | WO 2009/146544 | 12/2009 |

OTHER PUBLICATIONS

Overview page for IntuiFace by Intuilab, Copyright 2008.

Jacob O. Wobbrock et al., "User-Defined Gestures for Surface Computing", CHI 2009, Apr. 4-9, 2009, Boston, Massachusetts, USA.

Martin Kaltenbrunner and Ross Bencina, "reacTIVision 1.4", Released May 19, 2009 (ReacTIVision 1.0 was released Nov. 29, 2005), retrieved from <http://reactivision.sourceforge.net/#usage> on Dec. 15, 2009.

Paul D'Intino, "How I Built ORION mt" May 11, 2008 taken from <http://orionmultitouch.blogspot.com/2008/05/how-i-built-orion-mt.html> on Nov. 23, 2009.

Villamor et al. "Touch Gesture Reference Guide", Apr. 15, 2010.

Touch Panel, vol. 5 No. 4 (Nov. 2010).

Touch Panel, vol. 5 No. 2-3 (Sep. 2010).

International Search Report and Written Opinion for PCT/CA2009/001357 dated Oct. 23, 2009.

International Search Report and Written Opinion for PCT/CA2009/001356 dated Jan. 4, 2010.

International Search Report and Written Opinion for PCT/CA2010/001085 mailed Oct. 12, 2010.

Douskos V., et al., "Fully Automatic Camera Calibration using Regular Planar Patterns", Laboratory of Photogrammetry, Department of Surveying, National Technical University of Athens (NTUA), GR-15780 Athens, Greece [online], Jun. 1, 2008; http://www.isprs.org/congresses/beijing2008/proceedings/5_pdf/04.pdf.

Douskos V., et al., "Fully Automatic of Digital Cameras Using Planar Chess-board Patterns", Department of Surveying, National Technical University of Athens (NTUA), GR-15780 Athens, Greece [online], May 1, 2007; http://www.survey.ntua.gr/main/labs/photo/staff/gkarras/Karras_O3DM_2007.pdf.

International Search Report and Written Opinion for PCT/CA2009/001358 dated Jan. 6, 2010.

International Search Report and Written opinion for PCT/CA2010/000002, dated Jun. 2, 2010.

International Search Report and Written Opinion for PCT/CA2009/001734 dated Feb. 23, 2010.

Hancock, M., et al. "Shallow-Depth 3D Interaction: Design and Evaluation of the One-, Two- and Three-Touch Techniques" In: CHI 2007, Proceedings of the SIGCHI Conference on Human Factors in Computing Systems, pp. 1147-1156, Apr. 28-May 3, 2007, San Jose, California.

Streitz, et al., "i-Land: an interactive landscape for creativity and innovation", Proceedings of CHI '99, 120-127, (1999).

Piper, et al. "SIDES: A Cooperative Tabletop Computer Game fo Social Skills Development", Proceedings of CSCW 2006, 1-10.

MacKenzie, "A note on the information theoretic basis for Fitts' Law", Journal of Motor Behavior, 21:323-330, (1989).

Hancock, et al. "Shallow-depth 3D interaction: design and evaluation of one-, two and three-touch techniques", in CHI '07: Proceedings of the SIGCHI Conference on Human Factos in Computing Systems, pp. 1147-1156. ACM, New York, NY USA, (2007).

Agarawal et al., "Keepin' it real: pushing the desktop metaphor with physics, piles, and the pen", in CHI '06: Proceedings of the SIGCHI Conference on Human Factors in Computing Systems, pp. 1283-1292. ACM, NY, NY, USA, (2006).

(56) References Cited

OTHER PUBLICATIONS

Balakrishnan et al. "Exploring bimanual camera control and object manipulation in 3D graphics interfaces." In CHI '99: Proceedings of the SIGCHI Conference on Human Factors in Computing Systems, pp. 56-62 (1999). ACM, New York, NY, USA.

Bers et al. "Interactive storytelling environments: coping with cardiac illness at Boston's Children's Hospital." In CHI '99: Proceedings of the SIGCHI Conference on Human Factors in Computing Systems, pp. 603-610 (1998). ACM Press/Addison-Wesley Publishing Co., New York, NY, USA.

Bradway "What is sandplay?" In Journal of Sandplay Therapy, vol. 15, No. 2, pp. 7-9 (2006).

Cao, et al. "Shapetouch: Leveraging contact shape on interactive surfaces." in TABLETOP 2008: 3rd IEEE International Workshop on Horizontal Interactive Human Computer Systems, pp. 129-136 (Oct. 2008).

Cassell, et al. "StoryMat: A playspace for collaborative storytelling." In CHI '99: Proceedings of the SIGCHI Conference on Human Factors in Computing Systems. ACM, New York, NY, USA (May 1999).

Cassell, et al. "Making space for voice: Technologies to support children's fantasy and storytelling." In Personal and Ubiquitous Computing, vol. 5, No. 3 (2001).

Davidson, et al. "Extending 2D object arrangement with pressure-sensitive layering cues." In UIST '08: Proceedings of the 21st annual ACM symposium on User Interface Software and Technology, pp. 87-90. ACM, New York, NY, USA (2008).

Dietz, et al. "DiamondTouch: a multi-user touch technology." In UIST '01: Proceedings of the 14th annual ACM symposium on User Interface Software and Technology, pp. 219-226. ACM, New York, NY, USA (2001).

Forlines, et al. "Under my finger: Human factors in pushing and rotating documents across the table." In Human-Computer Interaction—INTERACT 2005, vol. 3585, pp. 994-997. Springer Berlin / Heidelberg (2005).

Fröhlich, et al. "Physically-based manipulation on the Responsive Workbench." In IEEE Virtual Reality Conference 2000 (VR 2000), pp. 5-12 (Mar. 2000).

Gartner "Fast and robust smallest enclosing balls." In Proceedings of the 7th Annual European Symposium on Algorithms (ESA), pp. 325-338. Springer-Verlag (1999).

Garland, et al. "Surface simplification using quadric error metrics." In SIGGRAPH '97: Proceedings of the 24th annual conference on Computer graphics and interactive techniques, pp. 209-216. ACM Press/Addison-Wesley Publishing Co., New York, NY, USA (1997).

Michael Garland (1999). Quadric-based polygonal surface simplification. Ph.D. thesis, Carnegie Mellon University, Pittsburgh, PA, USA. Chair—Paul Heckbert.

Michael Garland (2004). "QSlim Simplification Software." Retrieved Mar. 4, 2009, URL http://mgarland.org/software/qslim.html.

Grossman et al.(Oct. 2007). "Going deeper: a taxonomy of 3D on the tabletop." In TABLETOP '07: Second Annual IEEE International Workshop on Horizontal Interactive Human-Computer Systems, pp. 137-144.

Jefferson Y. Han (2005). "Low-cost multi-touch sensing through frustrated total internal reflection." In UIST '05: Proceedings of the 18th annual ACM symposium on User Interface Software and Technology, pp. 115-118. ACM, New York, NY, USA.

Hancock, et al. (2006). "Rotation and translation mechanisms for tabletop interaction." In TABLETOP 2006: First IEEE International Workshop on Horizontal Interactive Human-Computer Systems, pp. 79-88. IEEE Computer Society, Los Alamitos, CA, USA.

Hancock, et al. (2007). "Supporting multiple off-axis viewpoints at a tabletop display." In TABLETOP '07: Second International Workshop on Horizontal Interactive Human-Computer Systems, pp. 171-178. IEEE Computer Society, Los Alamitos, CA, USA.

Hancock, et al. (2007). "Shallow-depth 3D interaction: design and evaluation of one-, two- and three-touch techniques." In CHI '07: Proceedings of the SIGCHI Conference on Human Factors in Computing Systems, pp. 1147-1156. ACM, New York, NY, USA.

Hilliges, et al.(Jul. 2007). "Designing for collaborative creative problem solving." In C&C '07: Proceedings of the 6th ACM SIGCHI Conference on Creativity & Cognition. ACM, New York, NY, USA.

Hoppe, et al. (1993). "Mesh optimization." In Computer Graphics, vol. 27, No. Annual Conference Series, pp. 19-26.

Hoppe (1996). "Progressive meshes." In Computer Graphics, vol. 30, No. Annual Conference Series, pp. 99-108.

Ishii, et al. (2004). "Bringing clay and sand into digital design—continuous tangible user interfaces." In BT Technology Journal, vol. 22, No. 4, pp. 287-299.

Jacob, et al. (1994). "Integrality and separability of input devices." In ACM Transactions on Computer-Human Interaction, vol. 1, No. 1, pp. 3-26.

Kal. "Introduction to sandplay therapy." Retrieved Apr. 11, 2009, URL http://www.sandplay.org/intro to sandplay therapy.htm.

Yuri Kravchik. "JPhysX." Retrieved Mar. 4, 2009, URL http://www.jphysx.com/.

Russell Kruger, Sheelagh Carpendale, Stacey D. Scott and Anthony Tang (2005). "Fluid integration of rotation and translation." In CHI '05: Proceedings of the SIGCHI Conference on Human Factors in Computing Systems, pp. 601-610. ACM, New York, NY, USA.

Yang Li, Ken Hinckley, Zhiwei Guan and James A. Landay (2005). "Experimental analysis of mode switching techniques in pen-based user interfaces." In CHI '05: Proceedings of the SIGCHI Conference on Human Factors in Computing Systems, pp. 461-470. ACM, New York, NY, USA.

Jun Liu, David Pinelle, Samer Sallam, Sriram Subramanian and Carl Gutwin (2006). "TNT: improved rotation and translation on digital tables." In GI '06: Proceedings of Graphics Interface 2006, pp. 25-32. Canadian Information Processing Society, Toronto, Ontario, Canada.

Microsoft Corporation. "Microsoft Surface." Retrieved Jan. 20, 2009, URL http://www.surface.com/.

NVIDIA Corporation. "NVIDIA PhysX." Retrieved Jan. 20, 2009, URL http://www.nvidia.com/object/nvidiaphysx.html.

"ARB vertex buffer object." Retrieved Mar. 4, 2009, URL http://www.opengl.org/registry/specs/ARB/vertex buffer object.txt.

Piper et al. (2008). "Supporting medical conversations between deaf and hearing individuals with tabletop displays." In CSCW '08: Proceedings of the 2008 ACM Conference on Computer Supported Cooperative Work, pp. 147-156. ACM, New York, NY, USA.

Jef Raskin (2000). The Humane Interface, chap. Meanings, Modes, Monotony and Myths. Addison-Wesley.

Adrian Reetz, Carl Gutwin, Tadeusz Stach, Miguel Nacenta and Sriram Subramanian (2006). "Superflick: a natural and efficient technique for long-distance object placement on digital tables." In GI '06: Proceedings of Graphics Interface 2006, pp. 163-170. Canadian Information Processing Society, Toronto, Ontario, Canada.

Kathy Ryall, Clifton Forlines, Chia Shen and Meredith Ringel Morris (2004). "Exploring the effects of group size and table size on interactions with tabletop shared-display groupware." In CSCW '04: Proceedings of the 2004 ACM Conference on Computer Supported Cooperative Work, pp. 284-293. ACM, New York, NY, USA.

Abigail J. Sellen, Gordon P. Kurtenbach and William A. S. Buxton (1992). "The prevention of mode errors through sensory feedback." In Human-Computer Interaction, vol. 7, No. 2, pp. 141-164.

"Simplified Wrapper and Interface Generator." Retrieved Mar. 4, 2009, URL http://www.swig.org/.

Lucia Terrenghi, David Kirk, Abigail Sellen and Shahram Izadi (2007)."Affordances for manipulation of physical versus digital media on interactive surfaces." In CHI '07: Proceedings of the SIGCHI Conference on Human Factors in Computing Systems, pp. 1157-1166. ACM, New York, NY, USA.

Greg Turk (1992). "Re-tiling polygonal surfaces." In SIGGRAPH Computer. Graph., vol. 26, No. 2, pp. 55-64.

Kristina Walter (2008). "Sand Play Therapy / Sandspieltherapie nach Dora M. Kal." Retrieved Apr. 11, 2009 (public domain), URL http://commons.wikimedia.org/wiki/File:Sandspiell.jpg.

Yao Wang, Assaf Biderman, Ben Piper, Carlo Ratti and Hiroshi Ishii. "Sandscape." Retrieved Jan. 20, 2009, URL http://tangible.media.mit.edu/projects/sandscape/.

(56) References Cited

OTHER PUBLICATIONS

Lance Williams (1978). "Casting curved shadows on curved surfaces." In SIGGRAPH Computer. Graph., vol. 12, No. 3, pp. 270-274.

Andrew D. Wilson, Shahram Izadi, Otmar Hilliges, Armando Garcia-Mendoza and David Kirk (2008). "Bringing physics to the surface." In UIST '08: Proceedings of the 21st annual ACM symposium on User Interface Software and Technology, pp. 67-76. ACM, New York, NY, USA.

Jacob O. Wobbrock, Andrew D. Wilson and Yang Li (2007). "Gestures without libraries, toolkits or training: a $1 recognizer for user interface prototypes." In UIST '07: Proceedings of the 20th annual ACM symposium on User Interface Software and Technology, pp. 159-168. ACM, New York, NY, USA.

Mike Wu and Ravin Balakrishnan (2003). "Multi-finger and whole hand gestural interaction techniques for multi-user tabletop displays." In UIST '03: Proceedings of the 16th annual ACM symposium on User Interface Software and Technology, pp. 193-202. ACM, New York, NY, USA.

Zagal, et al. (2004). "Kids telling fables through 3D animation." GVU Technical Report 23, Georgia Institute of Technology. URL http://hdl.handle.net/I853/3732.

Zagal, et al. (2006). "Social and technical factors contributing to successful 3D animation authoring by kids." GVU Technical Report 14, Georgia Institute of Technology. URL http://hdl.handle.net/I853/13120.

* cited by examiner

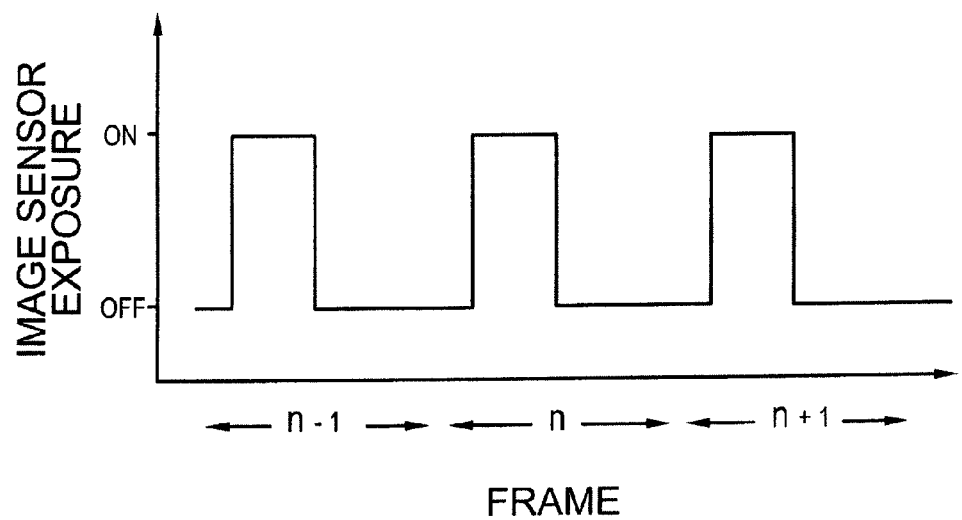
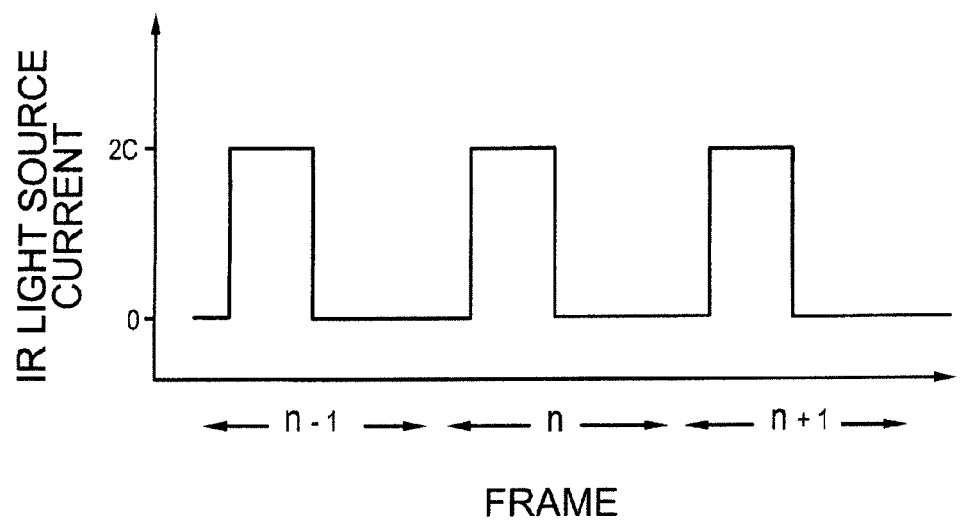
FIG. 5

INTERACTIVE INPUT SYSTEM WITH IMPROVED SIGNAL-TO-NOISE RATIO (SNR) AND IMAGE CAPTURE METHOD

CROSS-REFERENCE TO RELATED APPLICATION

This application claims the benefit of U.S. Provisional Application No. 61/239,057 filed on Sep. 1, 2009 to McGibney et al. entitled "Interactive Input System With Improved Signal-To-Noise Ratio (SNR) And Image Capture Method", the entire content of which is incorporated herein by reference.

FIELD OF THE INVENTION

The present invention relates generally to interactive input systems and in particular, to an interactive input system with improved signal-to-noise ratio and to an image capture method.

BACKGROUND OF THE INVENTION

Interactive input systems that allow users to inject input (eg. digital ink, mouse events etc.) into an application program using an active pointer (eg. a pointer that emits light, sound or other signal), a passive pointer (eg. a finger, cylinder or other suitable object) or other suitable input device such as for example, a mouse or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356 assigned to SMART Technologies ULC of Calgary, Alberta, Canada, assignee of the subject application, the entire contents of which are incorporated by reference; touch systems comprising touch panels employing electromagnetic, capacitive, acoustic or other technologies to register pointer input; tablet personal computers (PCs); laptop PCs; personal digital assistants (PDAs); and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports imaging devices in the form of digital cameras at its corners. The digital cameras have overlapping fields of view that encompass and look generally across the touch surface. The digital cameras acquire images looking across the touch surface from different vantages and generate image data. Image data acquired by the digital cameras is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the optical waveguide surface, causing some light to escape from the touch point. In a multi-touch interactive input system, the machine vision system captures images including the point(s) of escaped light, and processes the images to identify the position of the pointers on the optical waveguide surface based on the point(s) of escaped light for use as input to application programs.

One example of an FTIR multi-touch interactive input system is disclosed in U.S. Patent Application Publication No. 2008/0029691 to Han. Han discloses an optical waveguide in the form of a clear acrylic sheet, directly against a side of which multiple high-power infrared light emitting diodes (LEDs) are placed. The infrared light emitted by the LEDs into the acrylic sheet is trapped between the upper and lower surfaces of the acrylic sheet due to total internal reflection. A diffuser display surface is positioned over the non-contact side of the acrylic sheet with a small gap between the two in order to keep the diffuser display surface from frustrating the total internal reflection. According to one embodiment, a compliant surface overlay is disposed adjacent the contact surface of the acrylic sheet, with another small gap between the two layers in order to prevent the compliant surface overlay from frustrating the total internal reflection unless it has been touched. When touched, the compliant surface overlay in turn touches the acrylic sheet and frustrates the total internal reflection.

As will be appreciated, in interactive input systems that employ imaging devices to acquire images that are processed to detect pointer input, lighting is an important factor. In order for pointer contacts to be quickly and accurately determined while avoiding false pointer contacts, pointers must appear clearly in captured image frames. To facilitate pointer detection, illumination sources are often used with interactive input systems that employ imaging devices. These illumination sources emit radiation that is either occluded by pointers so that pointers appear as dark regions in an otherwise light image frame, or reflected by the pointers so that pointers appear as light regions in an otherwise dark image frame.

For example, U.S. Pat. No. 6,972,401 to Akitt et al. issued on Dec. 6, 2005 and assigned to SMART Technologies ULC, discloses an illuminated bezel for use in a touch system such as that described in above-incorporated U.S. Pat. No. 6,803, 906. The illuminated bezel emits infrared or other suitable radiation over the touch surface that is visible to the digital cameras. As a result, in the absence of a passive pointer in the fields of view of the digital cameras, the illuminated bezel appears in captured images as a continuous bright or "white" band. When a passive pointer is brought into the fields of view of the digital cameras, the passive pointer occludes emitted radiation and appears as a dark region interrupting the bright or "white" band in captured images allowing the existence of the pointer in the captured images to be readily determined and its position determined using triangulation.

In interactive input systems that employ illumination sources, ideally only illumination emitted by the illumination sources is detected by the imaging devices during image frame capture so that any pointer in the captured image frame can be clearly identified. Unfortunately, in most environments, during image frame capture detrimental light such as for example sunlight, light emitted by external sources, glare etc. is also detected by the imaging devices. This detrimental light can have a negative impact on the quality of captured image frames making it more difficult to identify pointers in captured image frames. Improvements are therefore desired.

It is therefore an object of the present invention to provide a novel interactive input system with improved signal-to-noise ratio and a novel image capture method.

SUMMARY OF THE INVENTION

In accordance with one aspect there is provided an input panel for an interactive input system comprising: an optical waveguide; a first radiation source directing radiation into said optical waveguide, said radiation undergoing total internal reflection within said optical waveguide; a diffusion layer adjacent to and on one side of the optical waveguide, totally internally reflected light being frustrated and escaping the optical waveguide in response to the pointer contacts on the diffusion layer; a second radiation source directing radiation towards another side of the optical waveguide that is opposite the one side; and at least one imaging device having a field of view looking at the optical waveguide and capturing image frames, wherein said first and second radiation sources are turned on and off in succession and wherein said first radiation source is turned off when said second radiation source is on and wherein said first radiation source is turned on when said second radiation source is off.

In one embodiment, the exposure time of the at least one imaging device is selected to be less than the total image frame capture time, and wherein either the first or second illumination source is caused to emit radiation at a higher intensity during the shortened exposure time. By reducing the amount of ambient, or detrimental, light captured during the shortened exposure times while relatively increasing the amount of desired light captured by increasing radiation emitted during the shortened exposure times, the signal to noise ratio is increased thereby facilitating improved pointer detection.

According to another aspect there is provided an interactive input system comprising: at least one imaging device capturing image frames of a region of interest, wherein the exposure time of said at least one imaging device is less than a total image frame capture time; at least one radiation source emitting radiation into the region of interest during the exposure time; and processing structure processing images captured by said at least one imaging device to determine the presence of any pointers within the region of interest.

According to another aspect there is provided a method of inputting information into an interactive input system comprising at least one imaging device capturing image frames of a region of interest, the method comprising: causing the at least one imaging device to its exposure time to be less than the total image frame capture time; emitting radiation from by at least one radiation source into the region of interest during the exposure time; and processing images captured by the at least one imaging device to determine presence of any pointers within the region of interest.

According to another aspect there is provided an imaging assembly for an interactive input system comprising: at least one imaging device capturing image frames of a region of interest, wherein the exposure time of said at least one imaging device is less than a total image frame capture time; and at least one radiation source emitting radiation into the region of interest substantially only during the exposure time.

BRIEF DESCRIPTION OF THE DRAWINGS

Embodiments will now be described more fully with reference to the accompanying drawings in which:

FIG. 5 shows image sensor and IR light source timing diagrams;

DETAILED DESCRIPTION OF THE EMBODIMENTS

Figure 1:
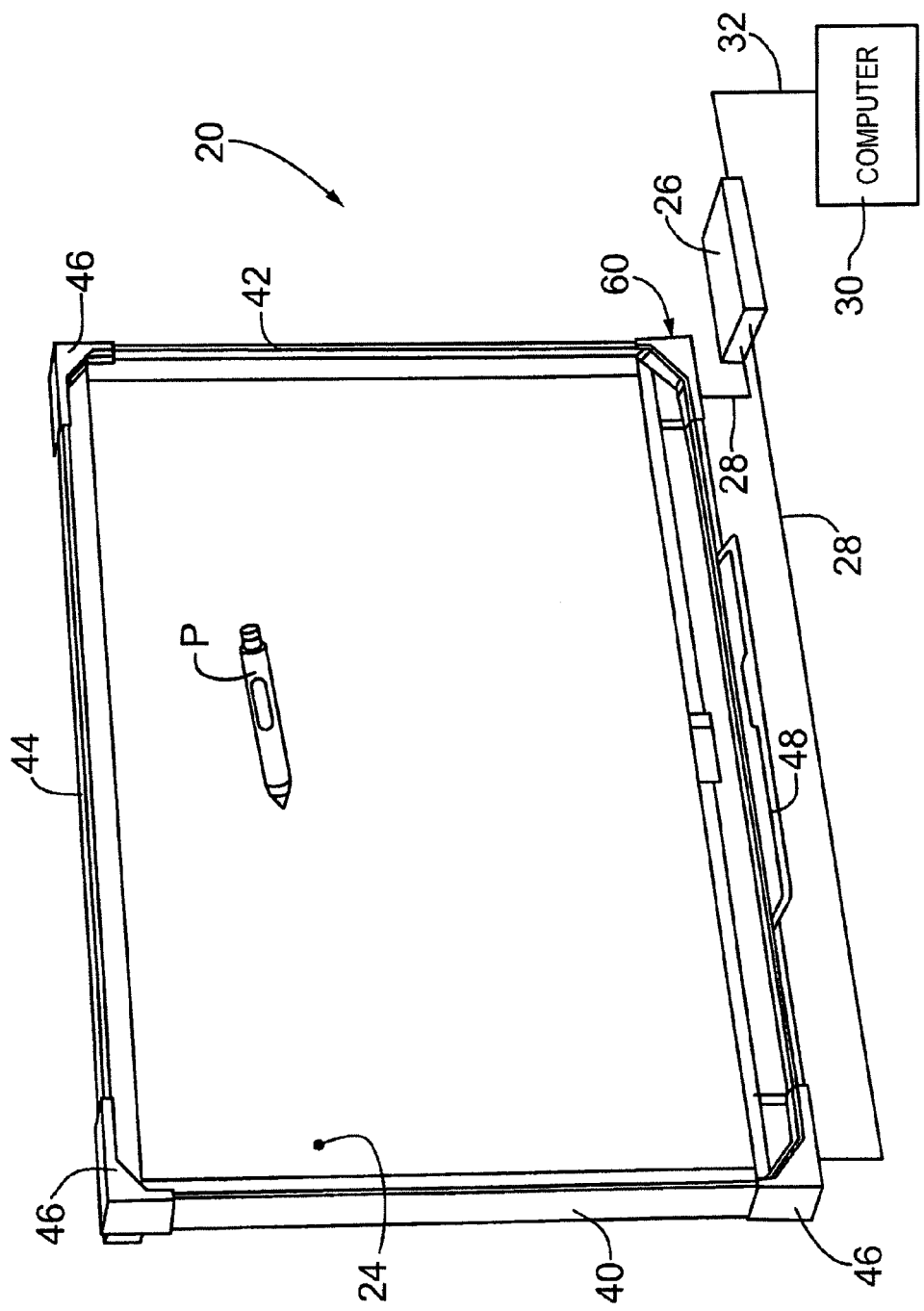
FIG. 1 is a perspective view of an interactive input system.
Figure 2:
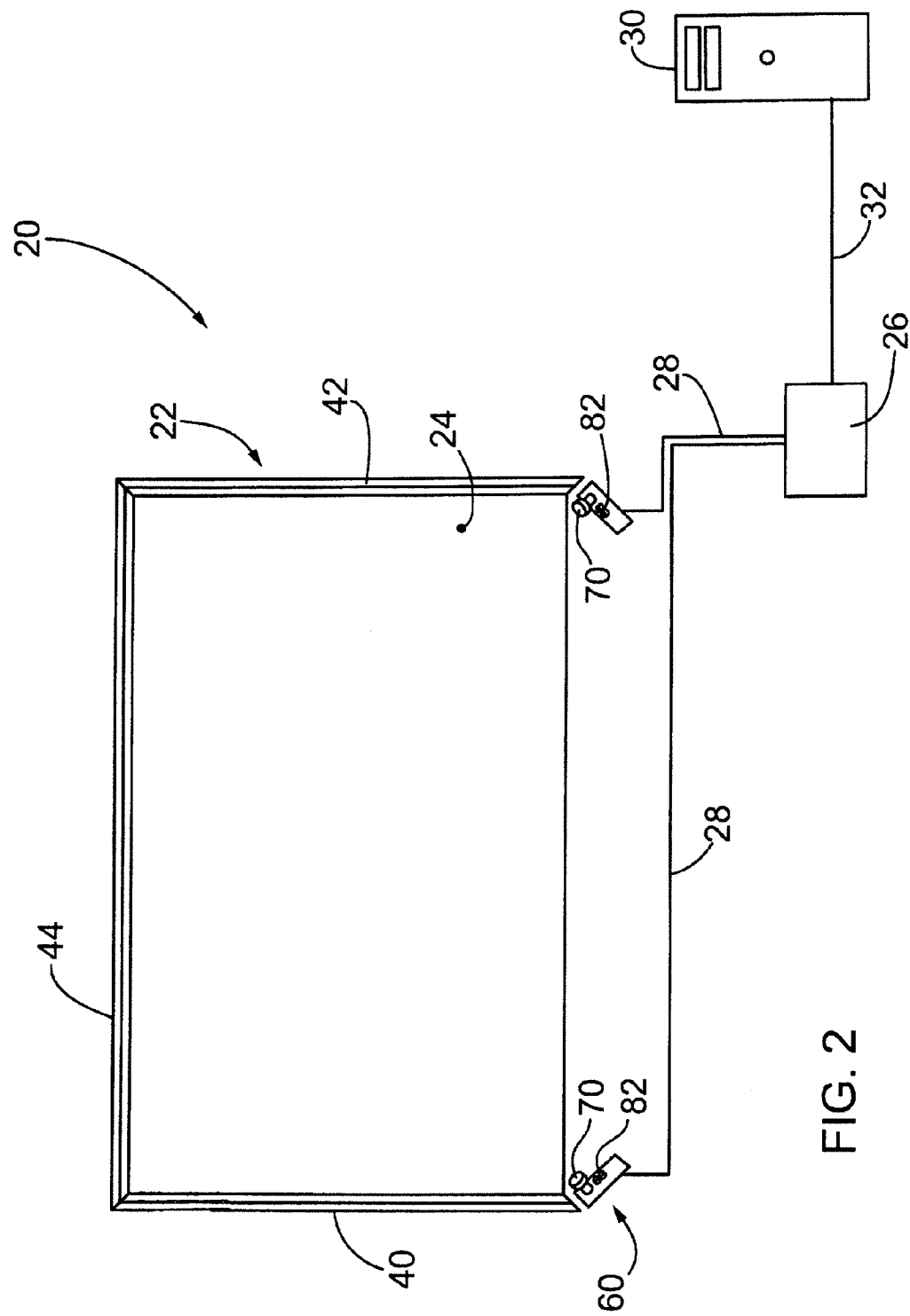
FIG. 2 is a front elevational view of the interactive input system of FIG. 1.

Turning now to FIGS. 1 and 2, an interactive input system that allows a user to inject input such as digital ink, mouse events etc. into an application program is shown and is generally identified by reference numeral 20. In this embodiment, interactive input system 20 comprises an assembly 22 that engages a display unit (not shown) such as for example, a plasma television, a liquid crystal display (LCD) device, a flat panel display device, a cathode ray tube etc. and surrounds the display surface 24 of the display unit. The assembly 22 employs machine vision to detect pointers brought into a region of interest in proximity with the display surface 24 and communicates with a digital signal processor (DSP) unit 26 via communication lines 28. The communication lines 28 may be embodied in a serial bus, a parallel bus, a universal serial bus (USB), an Ethernet connection or other suitable wired connection. Alternatively, the assembly 22 may communicate with the DSP unit 26 over a wireless connection using a suitable wireless protocol such as for example Bluetooth, WiFi, ZigBee, ANT, IEEE 802.15.4, Z-Wave etc. The DSP unit 26 in turn communicates with processing structure, in this embodiment a general purpose computing device 30 executing one or more application programs via a USB cable 32. Alternatively, the DSP unit 26 may communicate with the computing device 30 over another wired connection such as for example, a parallel bus, an RS-232 connection, an Ethernet connection, an IEEE 1394 connection etc. or may communicate with the computing device 30 over a wireless connection using a suitable wireless protocol such as for example Bluetooth, WiFi, ZigBee, ANT, IEEE 802.15.4, Z-Wave etc. Computing device 30 processes the output of the assembly 22 received via the DSP unit 26 and adjusts image data that is output to the display unit so that the image presented on the display surface 24 reflects pointer activity. In this manner, the assembly 22, DSP unit 26 and computing device 30 allow pointer activity proximate to the display surface 24 to be recorded as writing or drawing or used to control execution of one or more application programs executed by the computing device 30.

Assembly 22 comprises a frame assembly that is mechanically attached to the display unit and surrounds the display surface 24. The frame assembly comprises a bezel having three bezel segments 40, 42 and 44, four corner pieces 46 and a tool tray segment 48. Bezel segments 40 and 42 extend along opposite side edges of the display surface 24 while bezel segment 44 extends along the top edge of the display surface 24. The tool tray segment 48 extends along the bottom edge of the display surface 24 and supports one or more pen tools P. The corner pieces 46 adjacent the top left and top right corners of the display surface 24 couple the bezel segments 40 and 42 to the bezel segment 44. The corner pieces 46 adjacent the bottom left and bottom right corners of the display surface 24 couple the bezel segments 40 and 42 to the tool tray segment 48. In this embodiment, the corner pieces 46 adjacent the bottom left and bottom right corners of the display surface 24 accommodate imaging assemblies 60 that look generally across the entire display surface 24 from different vantages. The bezel segments 40, 42 and 44 are oriented so that their inwardly facing surfaces are seen by the imaging assemblies 60.

In this embodiment, the inwardly facing surface of each bezel segment 40, 42 and 44 comprises a single longitudinal strip or band of retro-reflective material. To take best advantage of the properties of the retro-reflective material, the bezel segments 40, 42 and 44 are oriented so that their inwardly facing surfaces extend in a plane generally normal to that of the display surface 24.

Figure 3:
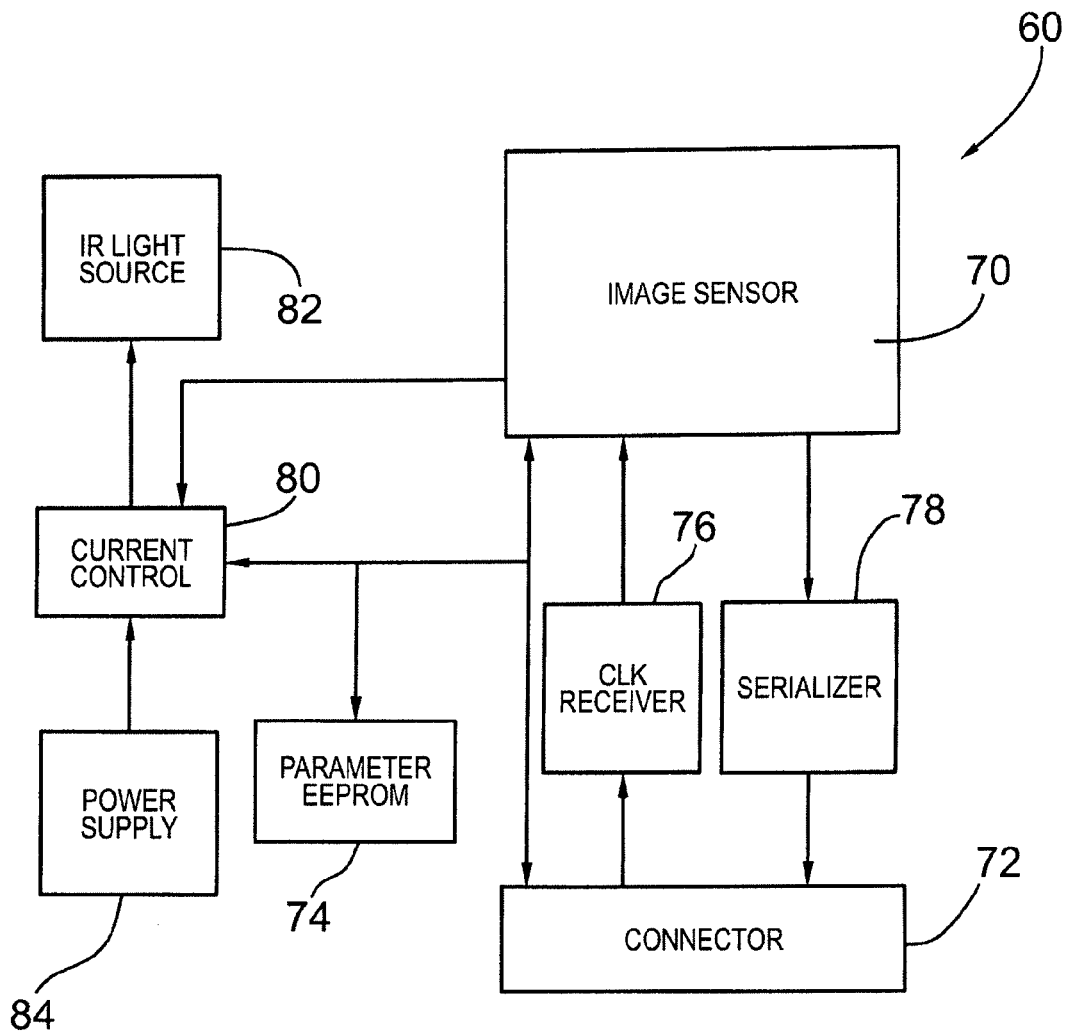
FIG. 3 is a block diagram of an imaging assembly forming part of the interactive input system of FIG. 1.

Turning now to FIG. 3, one of the imaging assemblies 60 is better illustrated. As can be seen, the imaging assembly 60 comprises an imaging device, or image sensor 70, such as that manufactured by Micron under model No. MT9V022 fitted with an 880 nm lens of the type manufactured by Boowon under model No. BW25B. The lens has an IR-pass/visible light blocking filter thereon (not shown) and provides the image sensor 70 with approximately a 98 degree field of view so that the entire display surface 24 is seen by the image sensor 70. The image sensor 70 is connected to a connector 72 that receives one of the communication lines 28 via an $I^2C$ serial bus. The image sensor 70 is also connected to an electrically erasable programmable read only memory (EEPROM) 74 that stores image sensor calibration parameters as well as to a clock (CLK) receiver 76, a serializer 78 and a current control module 80. The clock receiver 76 and the serializer 78 are also connected to the connector 72. Current control module 80 is also connected to an infrared (IR) light source 82 comprising a plurality of IR light emitting diodes (LEDs) and associated lens assemblies as well as to a power supply 84 and the connector 72.

The clock receiver 76 and serializer 78 employ low voltage, differential signaling (LVDS) to enable high speed communications with the DSP unit 26 over inexpensive cabling. The clock receiver 76 receives timing information from the DSP unit 26 and provides clock signals to the image sensor 70 that determine the rate at which the image sensor 70 captures and outputs image frames, where the reciprocal of the image frame capture rate is defined as the total image frame capture time. Each image frame output by the image sensor 70 is serialized by the serializer 78 and output to the DSP unit 26 via the connector 72 and communication lines 28.

Figure 4:
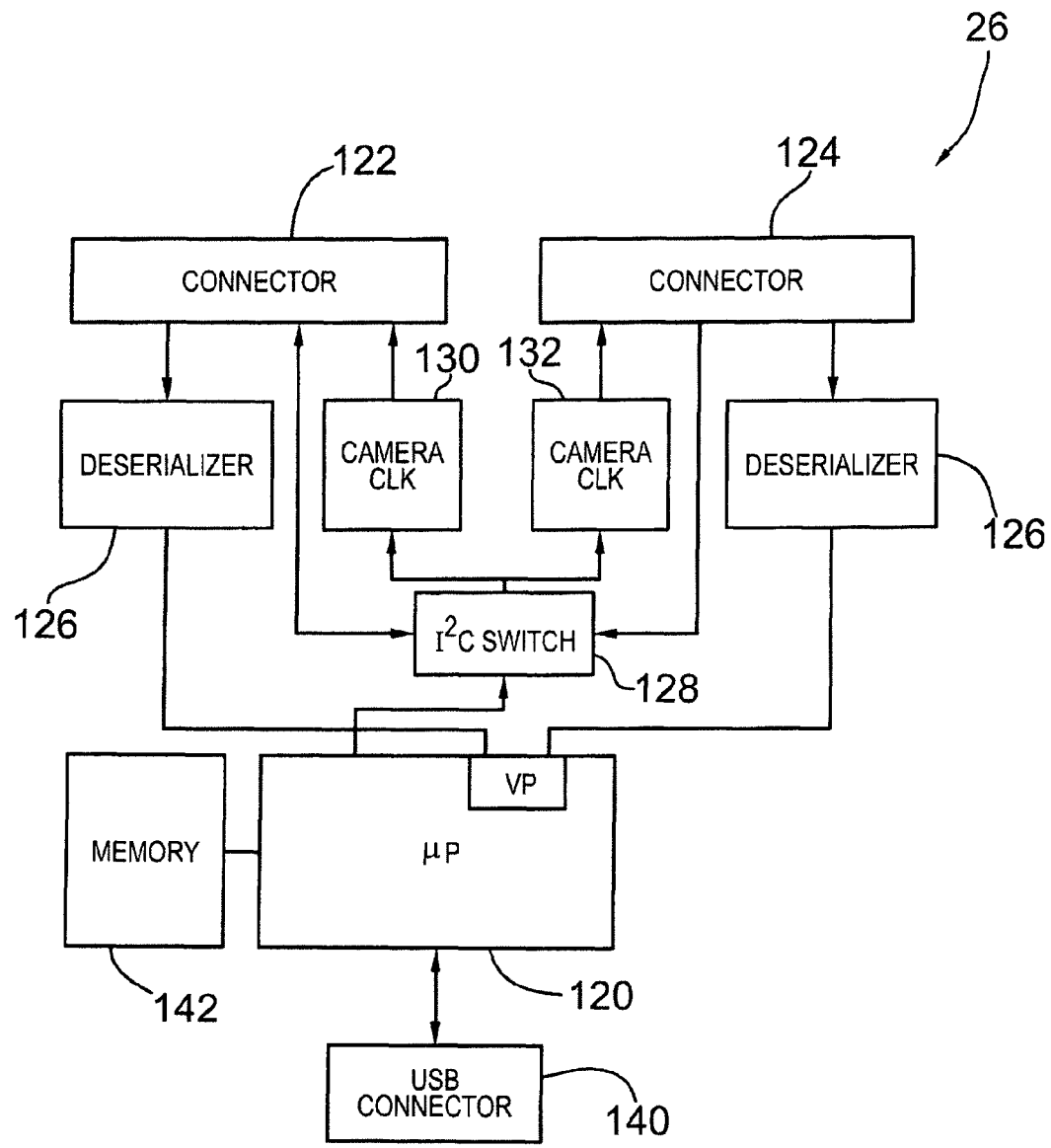
FIG. 4 is a block diagram of a digital signal processor forming part of the interactive input system of FIG. 1.

Turning now to FIG. 4, the DSP unit 26 is better illustrated. As can be seen, DSP unit 26 comprises a controller 120 such as for example, a microprocessor, microcontroller, DSP, other suitable processing structure etc. having a video port VP connected to connectors 122 and 124 via deserializers 126. The controller 120 is also connected to each connector 122, 124 via an $I^2C$ serial bus switch 128. $I^2C$ serial bus switch 128 is connected to clocks 130 and 132, each clock of which is connected to a respective one of the connectors 122, 124. The controller 120 communicates with a USB connector 140 that receives USB cable 32, and memory 142 including volatile and non-volatile memory. The clocks 130 and 132 and deserializers 126 similarly employ low voltage, differential signaling (LVDS).

The general purpose computing device 30 in this embodiment is a personal computer or other suitable processing device comprising, for example, a processing unit, system memory (volatile and/or non-volatile memory), other non-removable or removable memory (eg. a hard disk drive, RAM, ROM, EEPROM, CD-ROM, DVD, flash memory, etc.) and a system bus coupling the various computer components to the processing unit. The computing device 30 may also comprise networking capabilities using Ethernet, WiFi, and/or other network format, to enable connection to shared or remote drives, one or more networked computers, or other networked devices.

The interactive input system 20 is able to detect passive pointers such as for example, a user's finger, a cylinder or other suitable object as well as active pen tools P that are brought into proximity with the display surface 24 and within the fields of view of the imaging assemblies 60. For ease of discussion, the operation of the interactive input system 20, when a passive pointer is brought into proximity with the display surface 24, will be described.

During operation, the controller 120 conditions the clocks 130 and 132 to output clock signals that are conveyed to the imaging assemblies 60 via the communication lines 28. The clock receiver 76 of each imaging assembly 60 uses the clock signals to set the frame rate of the associated image sensor 70. The controller 120 also signals the current control module 80 of each imaging assembly 60 over the $I^2C$ serial bus. In response, each current control module 80 connects the IR light source 82 to the power supply 84 so that each IR light source 82 turns on when its associated image sensor is capturing an image frame.

As mentioned previously, typically during image frame capture, each image sensor 70 picks up the beneficial light emitted by its associated IR light source 82 that is reflected off of the bezel segments 40, 42 and 44 as well as detrimental light including for example, sunlight, light from external light sources, light emitted by the display unit, glare etc. As will be appreciated, this detrimental light interferes with image frame processing and may result in "false-positive" pointer detections. In this embodiment, to improve the signal-tonoise ratio of the interactive input system 20, an illumination/exposure balancing scheme is employed as will now be described.

To reduce the amount of detrimental light picked up by each image sensor 70 during image frame capture, the exposure time/period of each image sensor 70 is selected to be less than the total image frame capture time. As will be appreciated, although selecting the image frame exposure time to be less than the total image frame capture time reduces the amount of detrimental light picked up by each image sensor 70 during image frame capture, it also reduces the amount of beneficial light picked up by each image sensor 70. To increase the amount of beneficial light picked up by each image sensor 70 during the selected exposure period without a corresponding increase in the amount of detrimental light being picked up by the image sensor 70, the current control modules 80 are conditioned by the controller 120 to supply power to the IR light sources 82 in synchronization with the selected exposure periods of the image sensors 70. The IR light intensity is increased in accordance with the increase in power supplied.

In particular, the selected exposure period for each image sensor 70 is set to equal approximately forty percent (40%) of the typical total image frame. Thus, for each image sensor 70, during each image frame, the image sensor 70 is exposing for a period equal to 40% of the total image frame and remains off for the remainder of the image frame. During capture of image frames, when each image sensor 70 is turned on, its associated IR light source 82 is also turned on and when each image sensor 70 is turned off, its associated IR light source is turned off. FIG. 5 shows the image sensor and IR light source timing diagrams. Synchronizing the operation of the IR light source 82 to the selected exposure period of the image sensor 70 is achieved using the "flash" control signal from the image sensor, which is applied to the current control module 80 and used to activate the IR light source 82. During the selected exposure period, the amount of current supplied to the IR light source 82 is increased so that the IR light source is brighter than it would be during normal operation. Normal current refers to the manufacturers recommended current for continuous operation of the IR light source (100% duty-cycle, or non-pulsed). In order to achieve the higher current requirements for the pulses of light, charge is continually stored and replenished in one or more capacitors within the current control module 80, and is released to the light source upon receipt of the flash control signal from the image sensor 70. Pulsing is turned off automatically within the current control module in order to protect against running too much current for too long through the light sources.

For example, a hypothetical configuration may be considered in which the maximum current through an IR LED (light emitting diode) light source is 100 milliAmperes (mA) when the current stays constant (duty cycle=1, or 100%), and in which an image sensor 70 has an integration (exposure) time of 1 millisecond for a frame rate of 100 frames per second. The image sensor in this configuration would receive radiation from an IR LED and ambient light resulting in a base signal level of S and a base noise level of N, rendering the signal to noise ratio (SNR) to be S/N.

However, with this configuration, one is able to, according to manufacturer's recommended current for non-continuous, or "pulsed" operation of the IR LED, increase the peak current to the IR LED to 450 mA for a duty cycle of 0.1. This would, according to manufacturer's specifications, result in an increase in light intensity during integration of about four (4) times, resulting in a signal level of 4S. More particularly, the duty cycle of the IR LED could be reduced simply because it is only during exposure of the image sensor that illumination is required. With this configuration, because the ambient light, all other things being equal, will not have changed, the SNR will have increased by 4.

Further reducing the integration (exposure) time of the image sensor to 0.1 milliseconds would reduce the requirements of the IR LED duty cycle to 0.01, and thus, according to manufacturer's recommended current for non-continuous operation, the IR LED could receive a pulsed current at 1.35 A to produce ten (10) times the base level of light intensity. The exposure having been reduced by a factor of 10 would result in a signal level of S. However, the noise picked up during the reduced exposure time would be accordingly reduced by a factor of 10. Thus, the SNR would be improved by a factor of 10.

In general, as a result of the increased brightness of the IR light source 82 during exposure time, the associated image sensor 70 detects more illumination emitted by the IR light source (i.e. more beneficial light) and less detrimental light thereby increasing the signal-to-noise ratio and allowing for more robust and reliable image frame processing. Although increasing the brightness of the IR light source too much and for too long can reduce the lifetime of the IR light source, by cycling or pulsing IR LED operation, the IR light source specification on pulse handling capabilities is met to preserve the lifetime of the IR light source.

It will be understood that the IR light source is not required to provide a higher intensity of radiation precisely only during the selected exposure period. For example, the IR light source may be pulsed for longer than the exposure period. However, since the increased radiation is detected only during the exposure period, as a matter of efficiency and longevity of the IR light source, the exposure period and pulse period are preferably closely matched.

Figure 6A:
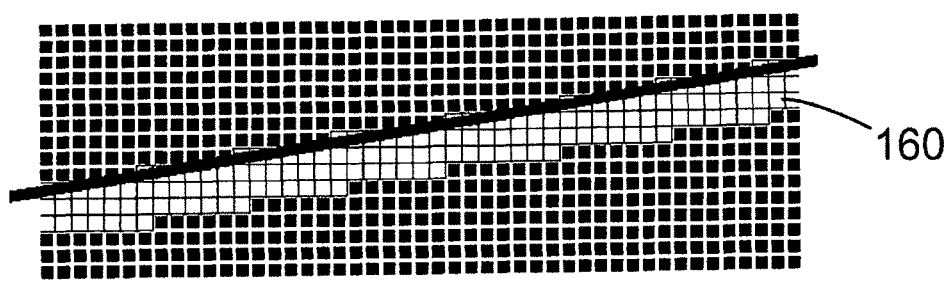
FIG. 6a is an image frame captured by the imaging assembly of FIG. 3 in the absence of a pointer within its field of view.
Figure 6B:
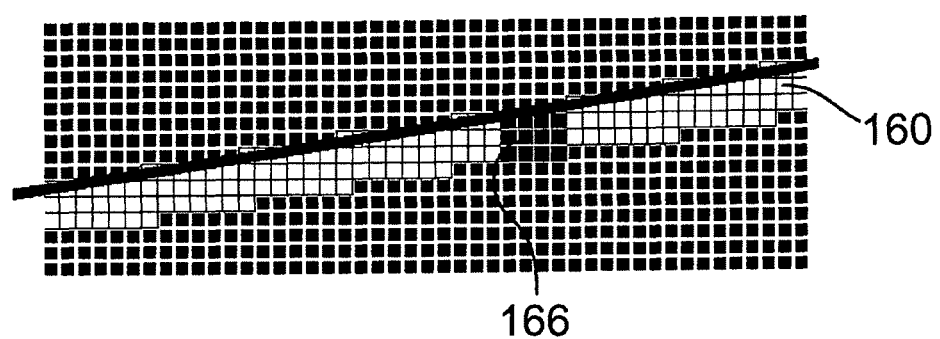
FIG. 6b is an image frame captured by the imaging assembly of FIG. 3 with a pointer within its field of view.

When the IR light sources 82 are on, the LEDs of the IR light sources flood the region of interest over the display surface 24 with infrared illumination. Infrared illumination that impinges on the retro-reflective bands of the bezel segments 40, 42 and 44 is returned to the imaging assemblies 60. As a result, in the absence of a pointer, each imaging assembly 60 sees a bright band 160 having a substantially even intensity over its length as shown in FIG. 6a. When a pointer is brought into proximity with the display surface 24 and is sufficiently distant from the IR light sources 82, the pointer occludes infrared illumination reflected by the retro-reflective bands of the bezel segments 40, 42 and 44. As a result, the pointer appears as a dark region 166 that interrupts the bright band 160 in captured image frames as shown in FIG. 6b.

As mentioned above, each image frame output by the image sensor 70 of each imaging assembly 60 is conveyed to the DSP unit 26. When the DSP unit 26 receives image frames from the imaging assemblies 60, the controller 120 processes the image frames to detect the existence of a pointer therein and if a pointer exists, to calculate the position of the pointer in (x,y) coordinates relative to the display surface 24 using well known triangulation in a manner similar to that described in above-incorporated U.S. Pat. No. 6,803,906 to Morrison et al. The calculated pointer coordinate is then conveyed by the controller 120 to the computing device 30 via the USB cable 32. The computing device 30 in turn processes the received pointer coordinate and updates the image output provided to the display unit, if required, so that the image presented on the display surface 24 reflects the pointer activity. In this manner, pointer interaction with the display surface 24 can be recorded as writing or drawing or used to control execution of one or more application programs running on the computing device 30.

In the above embodiments, each bezel segment 40 to 44 is shown as comprising a single strip of band of retro-reflective material. If desired, the bezel segments may comprise multiple bands having different reflective properties, such as for example retro-reflective and IR radiation absorbing bands or reflective and IR radiation absorbing bands.

Those of skill in the art will appreciate that the frame assembly may take other configurations. For example, the assembly 22 may comprise its own panel to overlie the display surface 24. In this case it is preferred that the panel of the assembly 22 be formed of substantially transparent material so that the image presented on the display surface 24 is clearly visible through the panel. The assembly 22 can of course be used with a front or rear projection device and surround a substrate on which the computer-generated image is projected.

Although the imaging assemblies are described as being accommodated by the corner pieces 46 adjacent the bottom corners of the display surface 24, those of skill in the art will appreciate that the imaging assemblies may be placed at different locations relative to the display surface. Also, the tool tray segment is not required and may be replaced with a bezel segment.

Figure 7:
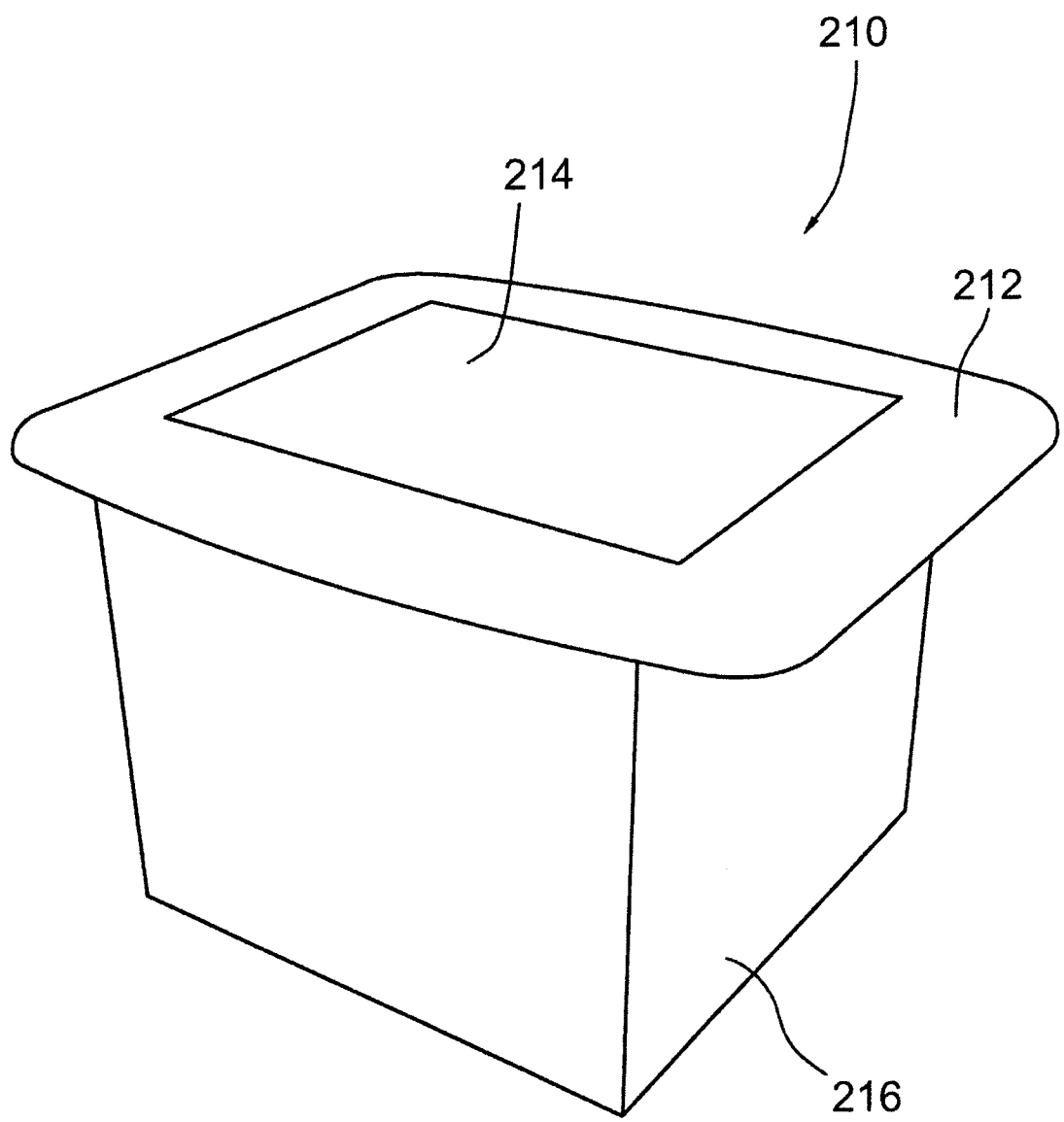
FIG. 7 is a perspective view of another embodiment of an interactive input system.
Figure 8:
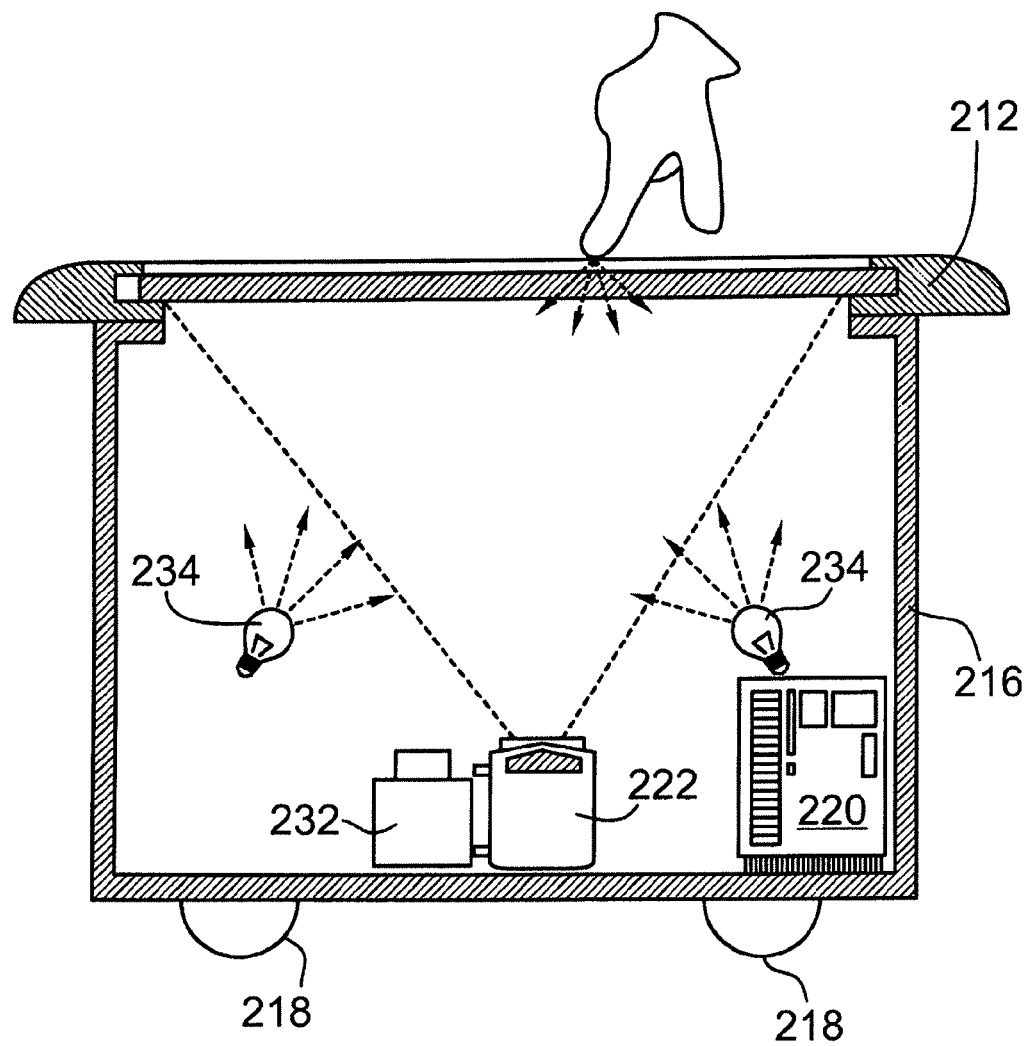
FIG. 8 is a side sectional view of the interactive input system of FIG. 7.

Turning now to FIGS. 7 and 8, an alternative interactive input system is shown and is generally identified by reference numeral 210. In this embodiment, the interactive input system is in the form of a touch table. Touch table 210 comprises a table top 212 mounted atop a cabinet 216. In this embodiment, cabinet 216 sits atop wheels, castors or the like 218 that enable the touch table 210 to be easily moved from place to place as desired. Integrated into table top 212 is a coordinate input device in the form of a frustrated total internal refraction (FTIR) based touch panel 214 that enables detection and tracking of one or more pointers, such as fingers, pens, hands, cylinders, or other objects, brought into proximity of the touch panel.

Cabinet 216 supports the table top 212 and touch panel 214, and houses processing structure 220 that executes a host application and one or more application programs. Image data generated by the processing structure 220 is displayed on the touch panel 214 allowing a user to interact with the displayed image via pointer contacts on the display surface of the touch panel 214. The processing structure 220 interprets pointer contacts as input to the running application program and updates the image data accordingly so that the image displayed on the display surface of the touch panel 214 reflects the pointer activity. In this manner, the touch panel 214 and processing structure 220 allow pointer interactions with the touch panel 214 to be recorded as handwriting or drawing or used to control execution of the application program.

Processing structure 220 in this embodiment is a general purpose computing device in the form of a computer. The computer comprises for example, a processing unit, system memory (volatile and/or non-volatile memory), other non-removable or removable memory (a hard disk drive, RAM, ROM, EEPROM, CD-ROM, DVD, flash memory etc.) and a system bus coupling the various computer components to the processing unit.

During execution of the host software application/operating system run by the processing structure, a graphical user interface comprising a canvas page or palette (i.e. a background), upon which graphic widgets are displayed, is presented on the display surface of the touch panel 214. In this embodiment, the graphical user interface enables freeform or handwritten ink objects and other objects to be input and manipulated via pointer interaction with the display surface of the touch panel 214.

The cabinet 216 also houses a projector 222 and an imaging device 232. The projector 222 is aimed to project an image directly onto the bottom surface of the touch panel 214 that is visible through the touch panel 214 from above. The imaging device 232 is similarly oriented so that its field of view encompasses the bottom surface of the touch panel 214. Two infrared (IR) light sources 234, in this example IR LEDs, are housed within the cabinet 216 at laterally spaced locations and operate at 60 Hz to illuminate the bottom surface of the touch panel 214.

The projector 222 and the imaging device 232 are each connected to and managed by the processing structure 220. A power supply (not shown) supplies electrical power to the electrical components of the touch table 210. The power supply may be an external unit or, for example, a universal power supply within the cabinet 216 for improving portability of the touch table 210. The cabinet 216 fully encloses its contents in order to restrict the levels of ambient visible and infrared light entering the cabinet 216 thereby to improve signal to noise performance. Doing this can compete with various techniques for managing heat within the cabinet 216. The touch panel 214, the projector 222, and the processing structure 220 are all sources of heat, and such heat if contained within the cabinet 216 for extended periods of time can reduce the life of components, affect performance of components, and create heat waves that can distort the optical components of the touch table 210. As such, the cabinet 216 houses heat managing provisions (not shown) to introduce cooler ambient air into the cabinet while exhausting hot air from the cabinet. For example, the heat management provisions may be of the type disclosed in U.S. patent application Ser. No. 12/240,953 to Sirotich et al. filed on Sep. 29, 2008 entitled "Touch Panel for an Interactive Input System, and Interactive System Incorporating the Touch Panel", assigned to SMART Technologies ULC of Calgary, Alberta, assignee of the subject application, the entire content of which is incorporated herein by reference.

Figure 9:
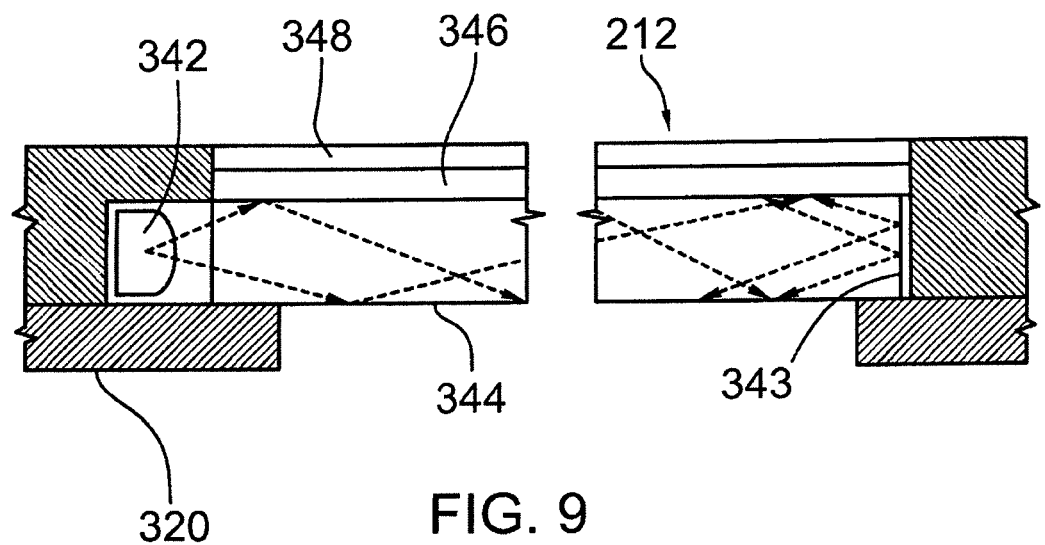
FIG. 9 is a sectional view of a table top and touch panel forming part of the interactive input system of FIG. 7.

As set out above, the touch panel 214 of touch table 210 operates based on the principles of frustrated total internal reflection (FTIR). FIG. 9 is a sectional view of the table top 212 and touch panel 214. Table top 212 comprises a frame 320 formed of plastic supporting the touch panel 214.

Touch panel 214 comprises an optical waveguide 344 that, according to this embodiment, is a sheet of acrylic. A resilient diffusion layer 346, in this embodiment a layer of V-CARE® V-LITE® barrier fabric manufactured by Vintex Inc. of Mount Forest, Ontario, Canada, or other suitable material, is applied to the upper surface of the optical waveguide 344 using a vacuum table to inhibit wrinkling and ensure a flush mount to the optical waveguide. The diffusion layer 346 diffuses the visible light projected onto it by the projector 222 so that the projected image is clearly displayed thereon.

Overlying the resilient diffusion layer 346 on the opposite side of the optical waveguide 344 is a clear, protective layer 348 having a smooth touch surface. In this embodiment, the protective layer 348 is a thin sheet of polycarbonate material over which is applied a hardcoat of Marnot® material, produced by Tekra Corporation of New Berlin, Wis., U.S.A. While the touch panel 214 may function without the protective layer 348, the protective layer 348 permits use of the touch panel 214 without undue discoloration, snagging or creasing of the underlying diffusion layer 346, and without undue wear on users' fingers. Furthermore, the protective layer 348 provides abrasion, scratch and chemical resistance to the overall touch panel 214, as is useful for panel longevity.

An IR light source 342 comprising a bank of IR light emitting diodes (LEDs) is positioned along at least one side surface of the optical waveguide layer 344 (into the page in FIG. 9). Each IR LED is operated at 60 Hz and emits infrared light into the optical waveguide layer 344. In this embodiment, the side surface along which the IR LEDs 342 are positioned is flame-polished to facilitate reception of light from the IR LEDs 342. An air gap of 1-2 millimeters (mm) is preferably maintained between the IR LEDs and the side surface of the optical waveguide 344 in order to reduce heat transmittance from the IR LEDs 342 to the optical waveguide 344, and thereby mitigate heat distortions in the acrylic optical waveguide 344. Bonded to the other side surfaces of the optical waveguide 344 is reflective tape 343 to reflect light back into the optical waveguide 344 thereby saturating the optical waveguide 344 with infrared illumination.

In operation, IR light emitted by the LEDs of the IR light source 342 is introduced into the optical waveguide 344 via its flame-polished side surface in a direction generally parallel to its upper and lower surfaces. The IR light does not escape through the upper or lower surfaces of the optical waveguide 344 due to total internal reflection (TIR) because its angle of incidence at the upper and lower surfaces is not sufficient to allow for its escape. The IR light reaching other side surfaces of the optical waveguide is generally reflected entirely back into the optical waveguide 344 by the reflective tape 343 at the other side surfaces.

Figure 10:
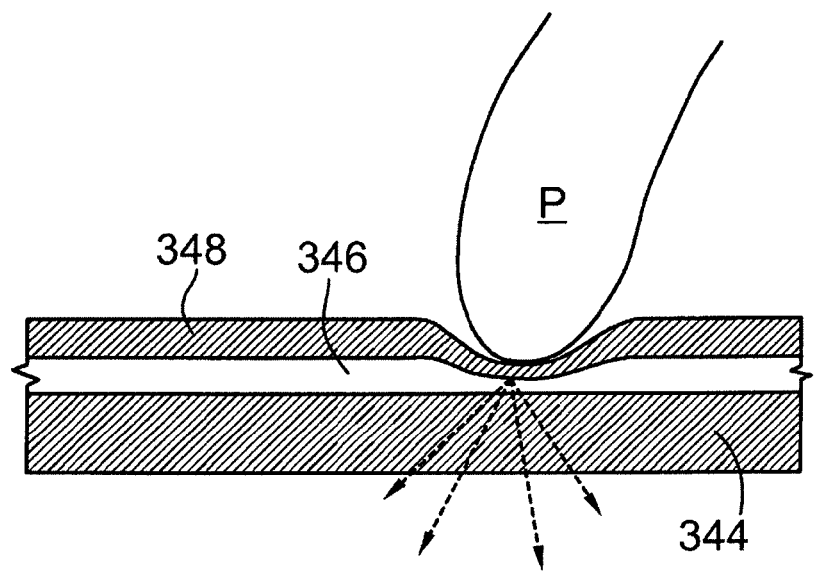
FIG. 10 is a sectional view of a portion of the touch panel of FIG. 9, having been contacted by a pointer.

As shown in FIG. 10, when a user contacts the display surface of the touch panel 214 with a pointer P, the pressure of the pointer P against the protective layer 348 compresses the resilient diffusion layer 346 against the optical waveguide 344, causing a change in the index of refraction at the contact point or "touch point". This change "frustrates" the TIR at the touch point causing IR light to escape from the optical waveguide 344. The escaping IR light reflects off of the diffusion layer 346 where depressed by the pointer P, scatters locally downward through the optical waveguide 344 and exits the optical waveguide 344 through its bottom surface. This occurs for each pointer P as it contacts the display surface of the touch panel 214 at a respective touch point.

As each touch point is moved along the display surface of the touch panel 214, compression of the resilient diffusion layer 346 against the optical waveguide 344 occurs and thus escaping of IR light tracks the touch point movement. During touch point movement or upon removal of the touch point, decompression of the diffusion layer 346 where the touch point had previously been due to the resilience of the diffusion layer 346, causes escape of IR light from optical waveguide 344 to once again cease. As such, IR light escapes from the optical waveguide 344 only at touch point location(s) allowing the IR light to be captured in image frames acquired by the imaging device 232.

The imaging device 232, which operates at a frame rate double that of the IR light source 342 and the IR light sources 234, is synchronized with the IR light source 342 and the IR light sources 234 such that every even image frame is captured while the IR light source 342 is on and the IR light sources 234 are off and every odd image frame is captured while the IR light source 342 is off and the IR light sources 234 are on. When the display surface of the touch panel 214 is contacted by one or more pointers as described above, the even image frames captured by imaging device 232 comprise one or more bright points corresponding to respective touch points as a result of the IR light that escapes the optical waveguide 344, which indicates that a contact with the touch panel has occurred. The processing structure 220 receives the captured image frames and performs image processing to detect the coordinates and characteristics of the one or more bright points in the captured images, as described in U.S. patent application Ser. No. 12/240,963 to Holmgren et al. filed on Sep. 29, 2008 entitled "Method for Calibrating an Interactive Input System Executing the Calibration Method" and assigned to SMART Technologies ULC, assignee of the subject application, the entire content of which is incorporated herein by reference. The detected coordinates are then mapped to display coordinates provided to the host application.

The host application tracks each touch point based on the received touch point data, and handles continuity processing between image frames. More particularly, the host application receives touch point data from image frames and based on the touch point data determines whether to register a new touch point, modify an existing touch point, or cancel/delete an existing touch point. Thus, the host application registers a Contact Down event representing a new touch point when it receives touch point data that is not related to an existing touch point, and accords the new touch point a unique identifier. Touch point data may be considered unrelated to an existing touch point if it characterizes a touch point that is a threshold distance away from an existing touch point, for example. The host application registers a Contact Move event representing movement of the touch point when it receives touch point data that is related to an existing pointer, for example by being within a threshold distance of, or overlapping an existing touch point, but having a different focal point. The host application registers a Contact Up event representing removal of the touch point from the display surface 215 of the touch panel 214 when touch point data that can be associated with an existing touch point ceases to be received from subsequent image frames. The Contact Down, Contact Move and Contact Up events are passed to respective elements of the user interface such as graphical objects, widgets, or the background/canvas, based on the element with which the touch point is currently associated, and/or the touch point's current position.

Figure 11A:
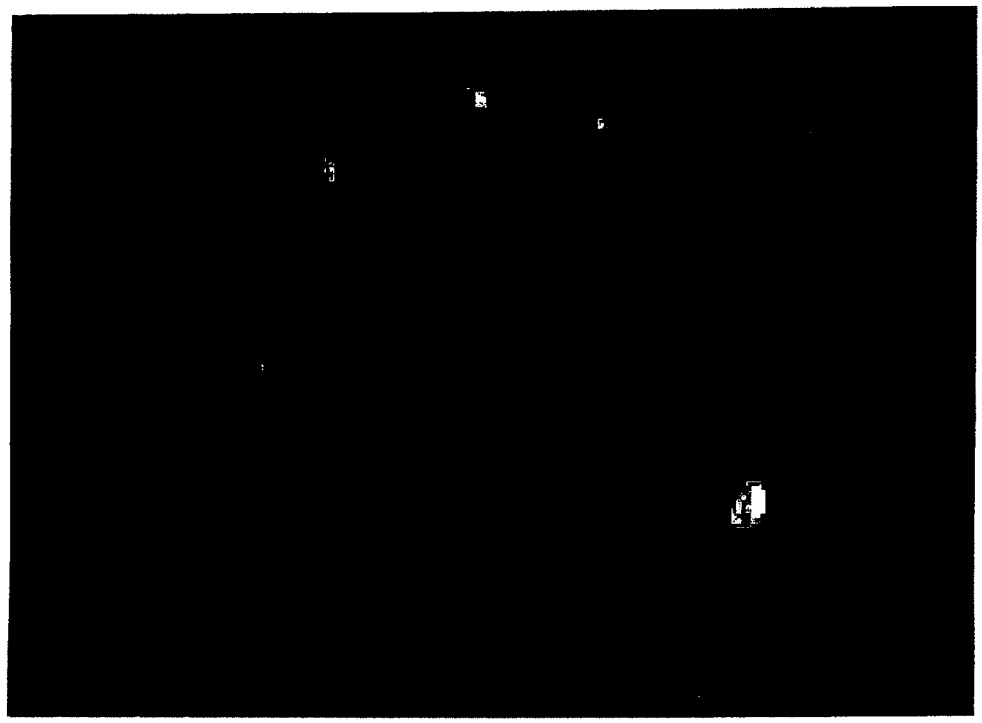
FIGS. 11a and 11b are images captured by an imaging device forming part of the interactive input system of FIG. 7.
Figure 11B:
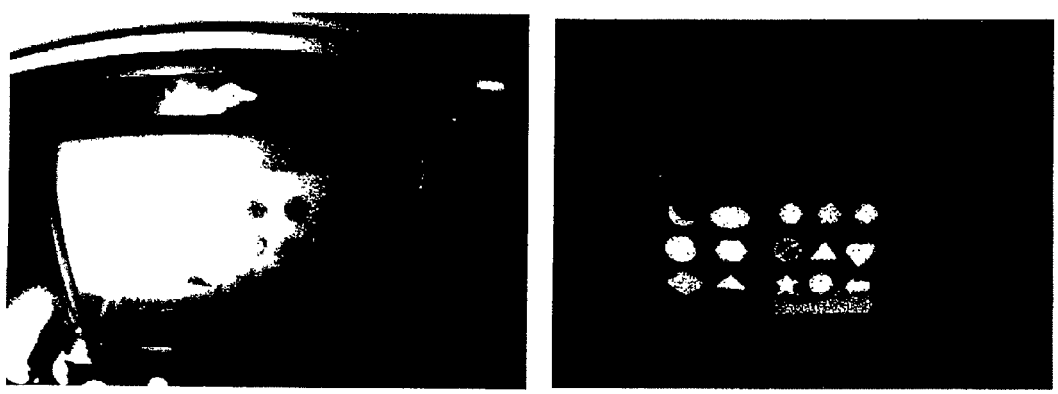

As mentioned above, the odd image frames captured by the imaging device 232 are captured when the IR light sources 234 are on and the IR light source 342 is off resulting in the table top being illuminated from below. As a result, these image frames comprise light reflected from pointers that are near to or in contact with the table top as shown in FIGS. 11a and 11b. Objects closer to the table top will appear brighter in captured image frames than objects further from the table top. The processing structure 220 receives the captured odd image frames and performs image processing using blob detection and object recognition to determine the location of each object relative to the table top and to determine the shape of each object. The direct illumination from the IR light sources 234 also enables objects above the touch surface that carry markers such as bar codes that can be read to be identified through processing of the image frames captured by the imaging device 232. Furthermore, in case there are tracing artifacts as a result of portions of the diffusion layer being slower to decompress after a pointer has been removed from contact therewith, the odd and even image frames can be compared in order to filter out the tracing artifacts and ascertain the location of the actual current touch points.

Figure 12:
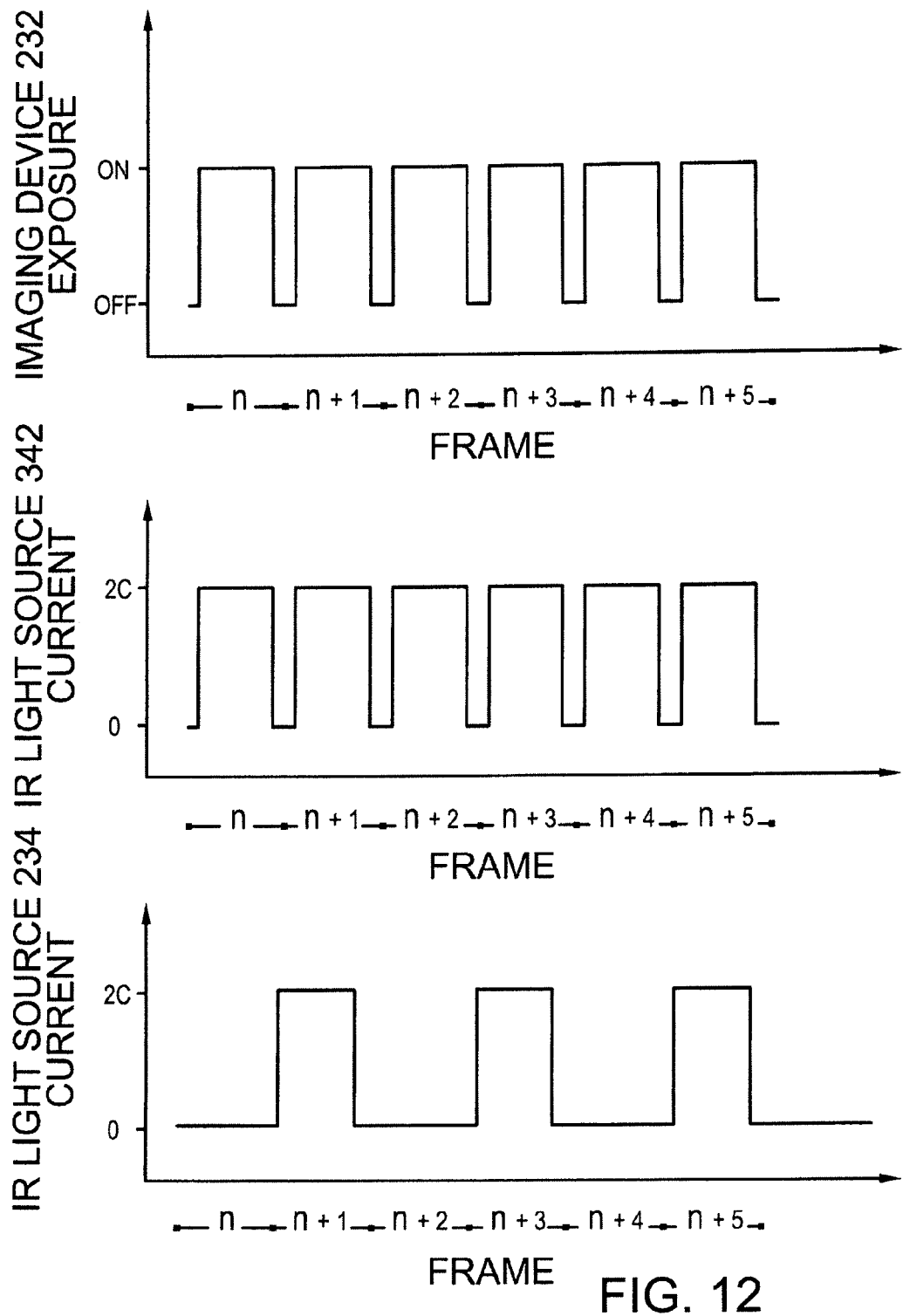
FIG. 12 shows imaging device and IR light source timing diagrams of the interactive input system of FIG. 7.

Similar to the previous embodiment, to reduce the amount of detrimental light picked up by the imaging device 232 during image frame capture, the exposure time of the imaging device is selected to be less than the total image frame capture time and the current supplied to the IR light sources 234 and 342 in synchronization with the selected exposure period is increased. As a result, during the exposure period of the imaging device 232 during image frame capture, either the IR light sources 234 or the IR light source 342, which ever is being operated for the current image frame emits increased illumination so that more beneficial illumination and less detrimental illumination is captured by the imaging device increasing the signal-to-noise level. FIG. 12 shows timing diagrams for the imaging device and IR light sources to achieve this operation.

In an alternative embodiment, rather than operating the IR light sources at 60 Hz, the IR light sources are operated at 30 Hz. In this case, imaging device 232 still captures image frames at the same frame rate. As a result for each successive pair of captured odd image frames, one odd image frame is captured while the IR light sources are on and one odd image frame is captured while the IR light sources are off. Prior to processing the image frames using blob detection and object recognition, a difference image frame is firstly formed by subtracting the two odd image frames to cancel the effects of ambient light. The resultant difference image frame is then processed using blob detection and object recognition to determine the location of each object relative to the table top and to determine the shape of each object.

Figure 13:
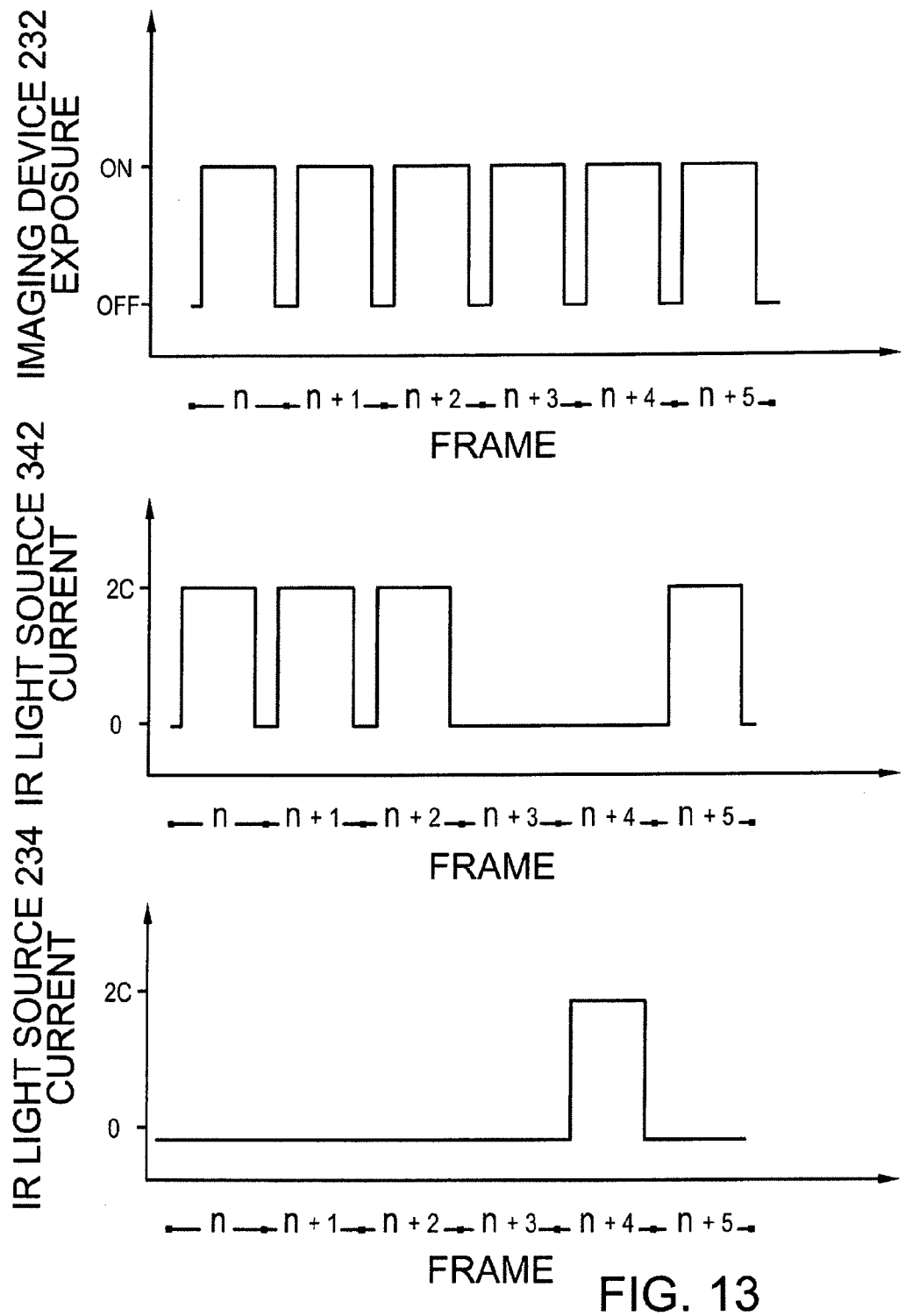
FIG. 13 shows imaging device and IR light source timing diagrams for an alternative operation of the interactive input system of FIG. 7.

FIG. 13 shows timing diagrams for an alternate operation of the interactive input system. In this embodiment, the imaging device captures image frames at the same rate and in synch with IR light source 342. When the processing structure 220 detects an object(s) it wants to recognize through processing of image frames that were captured while the IR light source 342 was on, the normal image capture process is interrupted for two image frames (frames n+3 and n+4). During this period the IR light source 342 remains off, and one image frame of the two image frames is captured while the IR light source 234 is off and the other image frame is captured while the IR light source 234 is on. Thus, the object(s) are captured through a direct illumination from below of the objects by light source 234 and may be distinguished from features in a background image captured with no direct illumination. The interactive input system then resumes its normal operation.

Figure 14:
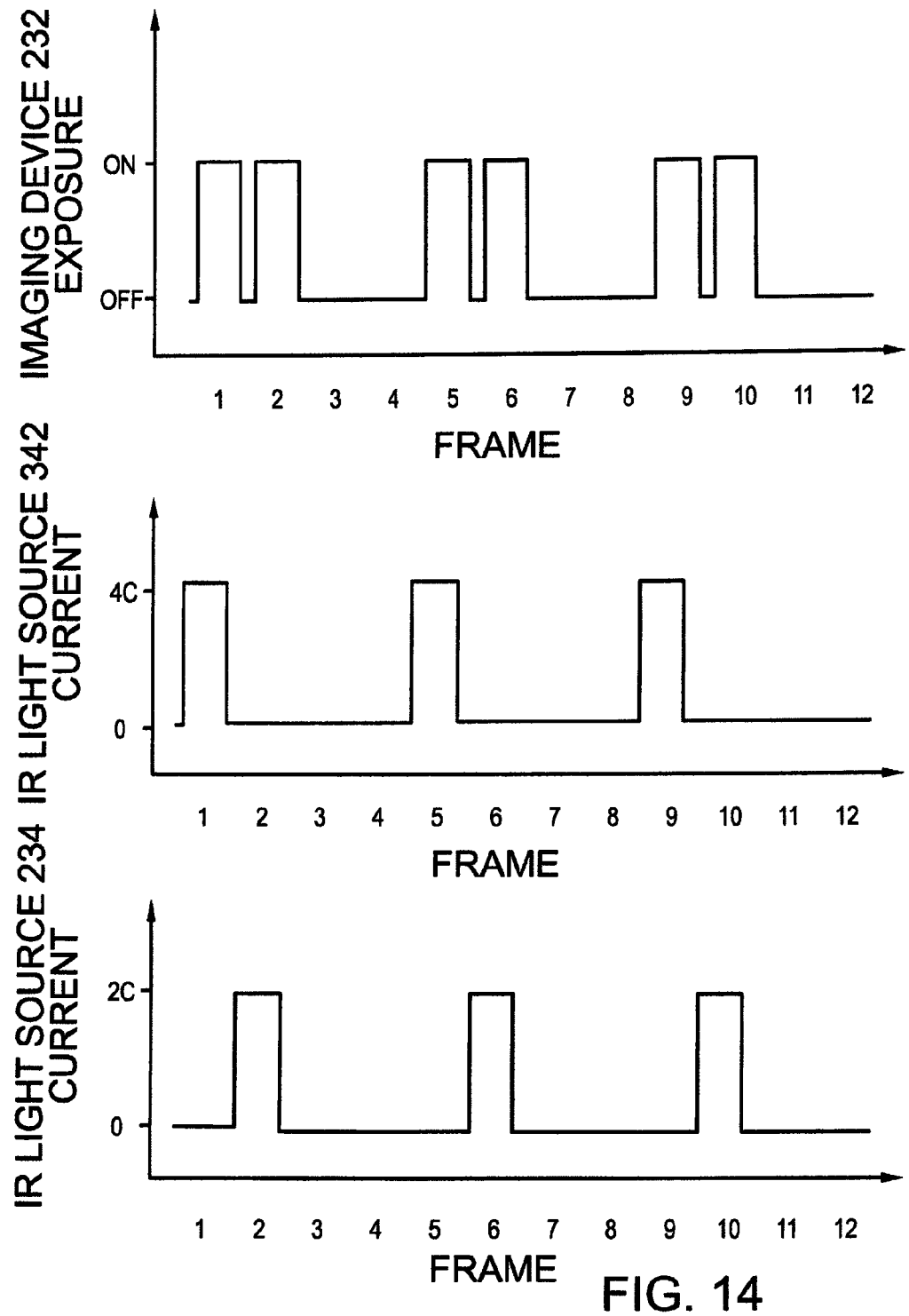
FIG. 14 shows imaging device and IR light source timing diagrams for yet another alternative operation of the interactive input system of FIG. 7.

FIG. 14 shows timing diagrams for an alternative operation of the interactive input system. In this embodiment, the frame rate of the imaging device is increased to 240 Hz, while the frequency of the IR light sources 234 and 342 remains at 60 Hz. The illumination period during operation of each IR light source 234 and 342 is set to equal 1/240 Hz=4.167 milliseconds. During this illumination period, the current driving the IR light sources is increased to 4 times the normal current to further improve the SNR as described above, but requires a more complex imaging device.

Figure 15:
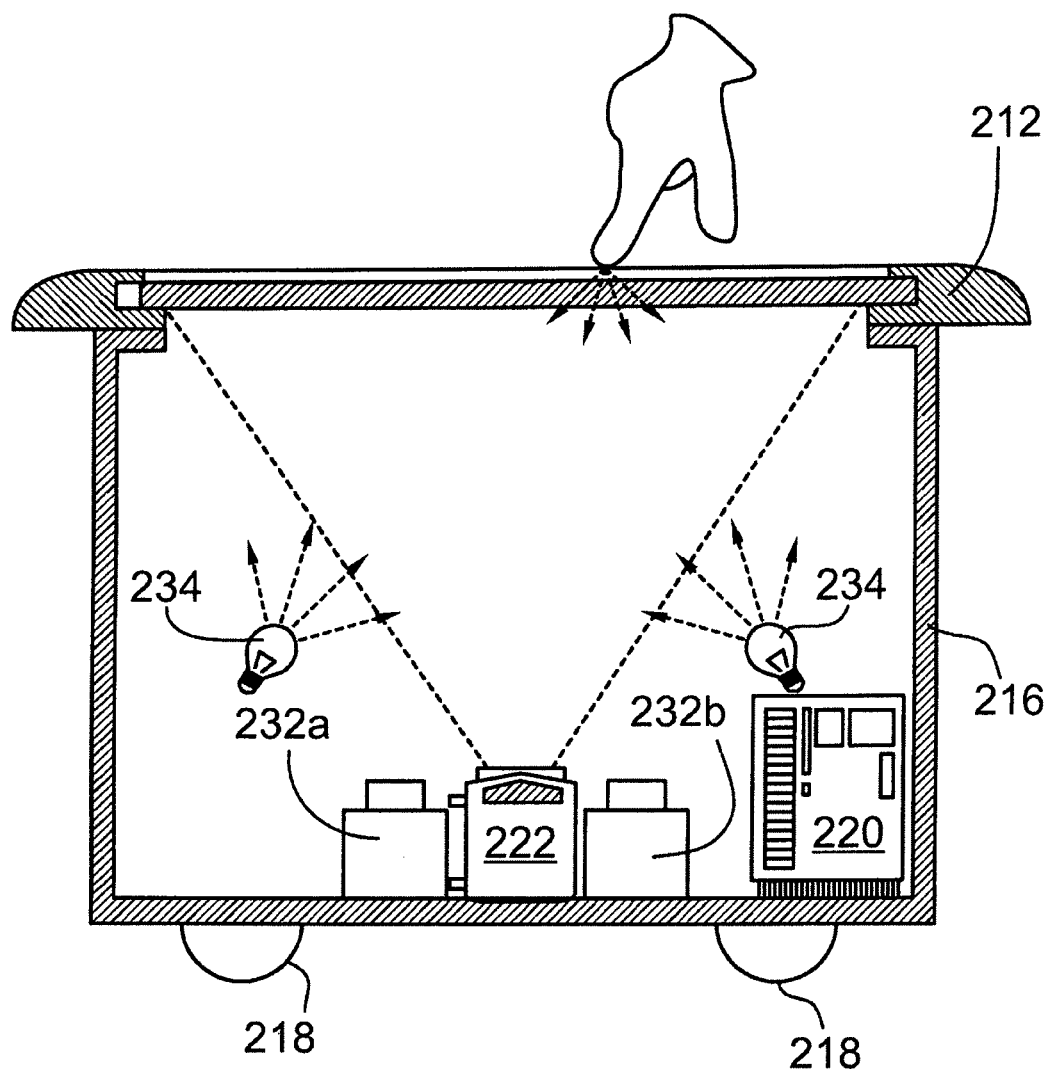
FIG. 15 is a side sectional view of yet another embodiment of an interactive input system.
Figure 16:
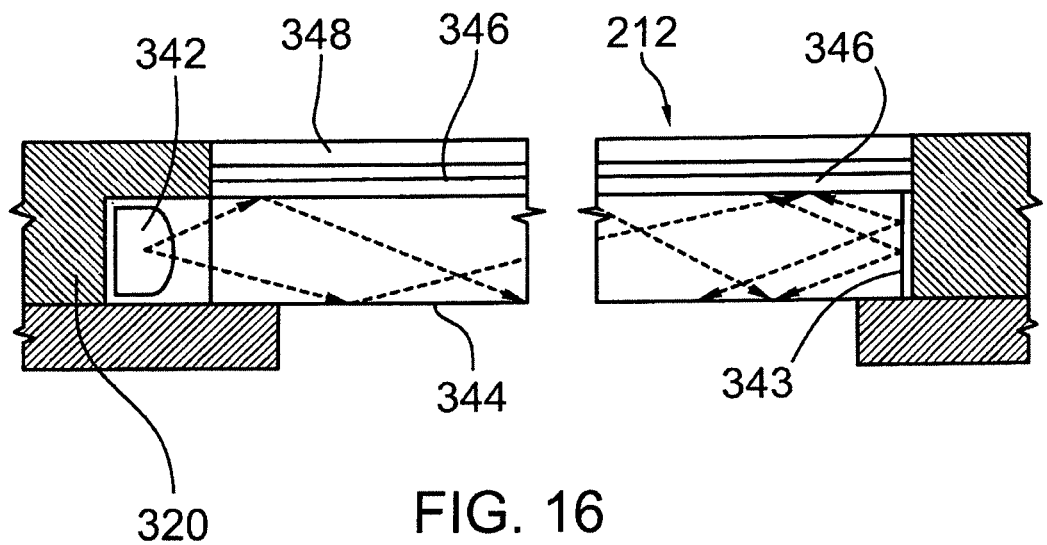
FIG. 16 is a sectional view of a table top and touch panel forming part of the interactive input system of FIG. 15.
Figure 17:
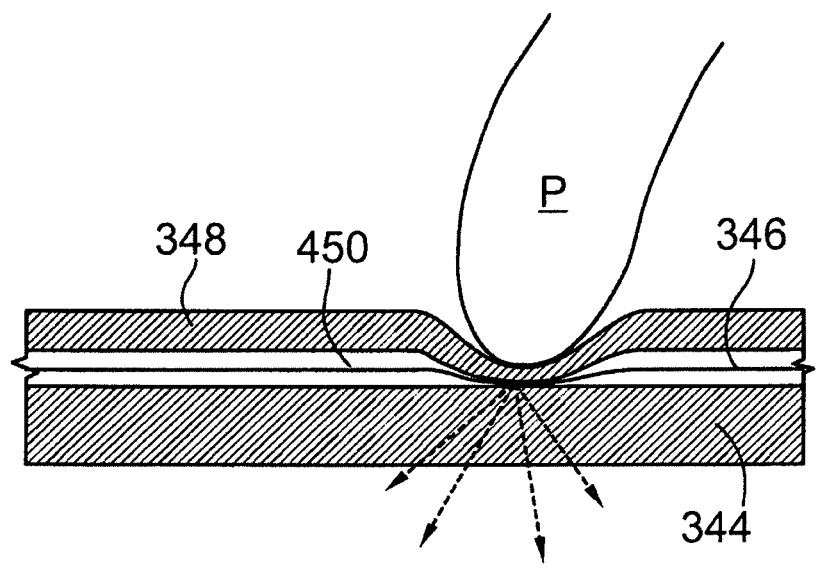
FIG. 17 is a sectional view of a portion of the touch panel of FIG. 16, having been contacted by a pointer.

Turning now to FIGS. 15 to 17, another embodiment of an interactive input system similar to that of FIGS. 7 to 10 is shown. In this embodiment, the cabinet 216 houses two imaging devices 232a and 232b. Each imaging device is positioned on an opposite side of the projector 222. The touch panel is similar to that of FIGS. 7 to 10 except that an IR reflective film 450 is positioned between the diffusion layer 346 and the protective layer 348. In this embodiment, the protective layer 348 is an optical film coating produced by Tekra Corporation of New Berlin, Wis., U.S.A. in the Terrapin family of materials. In this embodiment, the IR reflective film 450 contains a small amount of clear IR reflective material known as Near Infrared (NIR) reflective film. Certain of the ambient IR light coming from above the IR reflective film 450 and reaching the clear IR reflective material reflects off of the material and therefore does not reach the imaging devices 232a and 232b. Similarly, IR light escaping from the optical waveguide 344 at a touch point that reaches the IR reflective material in the IR reflective film above the optical waveguide 344 will, instead of being lost into the ambient, reflect off of the material and downwards towards the imaging devices. Unlike the embodiment of FIGS. 7 to 10, instead of a weave material for the resilient diffusion layer 346, a flat projection vinyl screen material produced by the Da-Lite Screen Company of Warsaw, Ind., U.S.A. is used to produce a sharper projected display image compared to the weave material due to its improved transmission characteristics over the weave material.

The imaging device 232a has an IR filter on its lens to only pass IR illumination of a first wavelength. The IR LED 342 emits infrared radiation into the optical waveguide 344 at this first wavelength. The IR reflective film 450 blocks ambient IR illumination at this first wavelength and thus allows the imaging device 232a to pick up only light emitted by the IR LED 342 thereby significantly reducing ambient light (background noise). The imaging device 232b has an IR filter on its lens to only pass IR illumination of a second wavelength different from the first wavelength. The IR light sources 234 emits infrared radiation at the second wavelength. This allows the imaging device 232b to detect light emitted only by the IR light sources 234, along with any ambient light finding its way into the cabinet 216 at the second wavelength.

Figure 18:
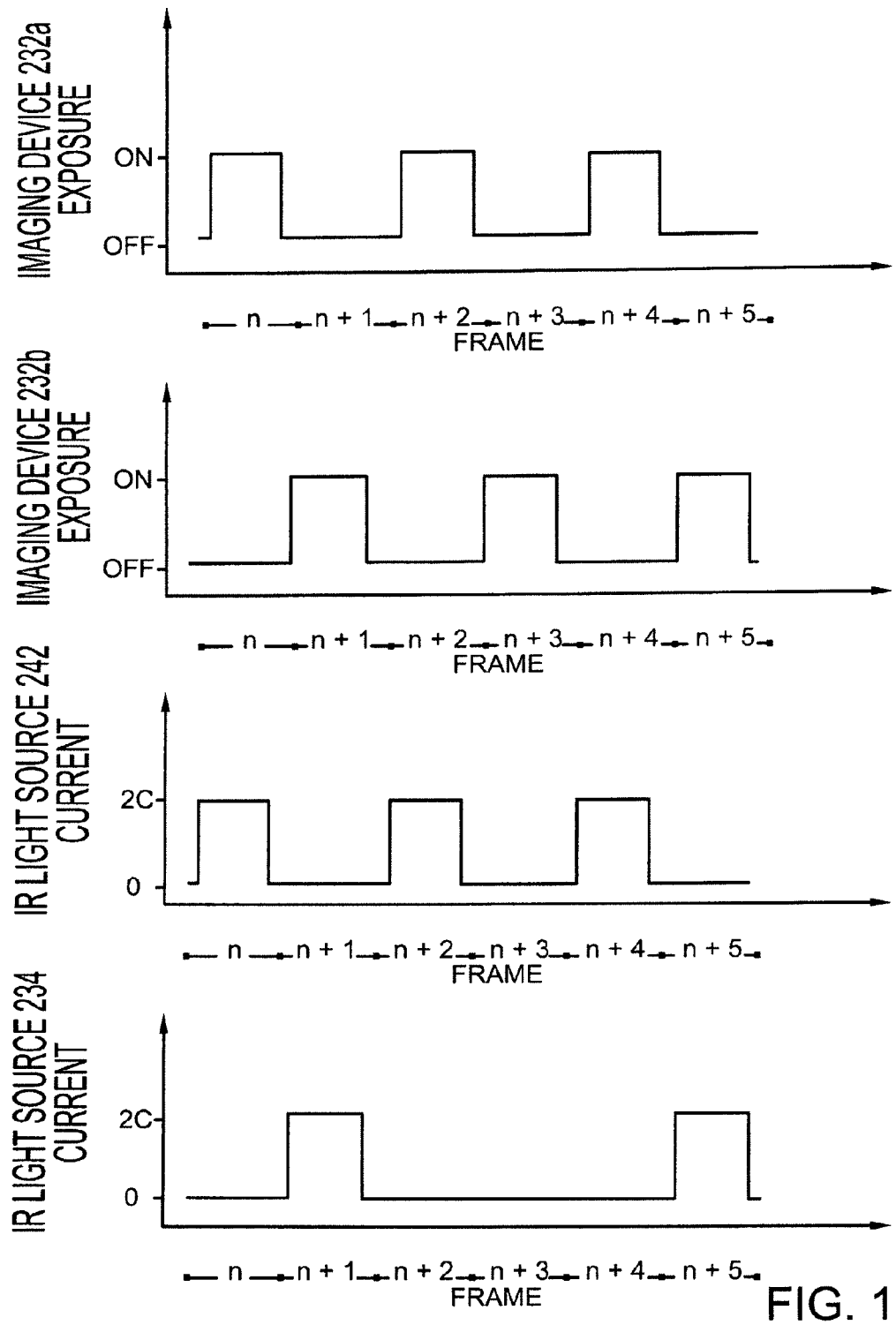
FIG. 18 shows imaging device and IR light source timing diagrams for the interactive input system of FIG. 15.

FIG. 18 shows the imaging device and IR light source timing diagrams for the interactive input system of FIGS. 15 to 17. It can be seen that the exposure times of imaging device 232a are opposite those of imaging device 232b, such that imaging device 232a is exposed when IR light source 342 is on and IR light sources 234 are off. Similarly, imaging device 232b is exposed when IR light source 342 is off, and is also exposed when IR light sources 234 are both on and off. Thus, imaging device 232b captures image frames of both the background and directly illuminated pointers or objects on or near to the touch surface, which can be processed to remove background features thereby correctly identify the location of objects on or proximate to the touch surface that reflect the IR light from IR light sources 234. In this embodiment, correct identification of objects includes distinguishing between tracing artifacts and actual touch points. For example, the flat vinyl screen projection material may not decompress as quickly as a weave material from the optical waveguide 344 after a pointer is lifted or moved from an earlier touch point. Because of this, IR light will tend to escape from the optical waveguide 344, reflect off of the IR reflective film 450, and down towards the imaging devices 232a, 232b. While the projection material will eventually decompress, its relative reluctance to do so, compared with the weave material, may leave apparent tracing artifacts, or streaks, that are captured by the imaging device 232a. Therefore, in order to filter out the tracing artifacts so as to correctly locate a pointer, the FTIR images captured by imaging device 232a are compared with directly illuminated images captured by imaging device 232b and the tracing artifacts identified and removed.

The table top 212 may be made of any rigid, semi-rigid or combination of rigid and malleable materials such as plastics, resins, wood or wood products, metal, or other suitable material or materials. For example, the table top 212 could be made of plastic and coated with malleable material such as closed cell neoprene. This combination would provide rigidity while offering a padded surface for users.

In alternative embodiments, processing structure 220 may be located external to cabinet 216, and may communicate with the other components of the touch table 210 via a wired connection such as Ethernet, RS-232, or USB, and the like, and/or a wireless connection such as Bluetooth™, or WiFi, and the like. It will also be understood that the optical waveguide 344 may be formed from a transparent or semi-transparent material other than acrylic, such as glass.

If desired, rather than orienting the projector and/or imaging device(s) so that they are aimed directly at the bottom surface of the optical waveguide 344, if desired, the orientation of the projection and/or imaging device(s) may be altered and one or more reflecting surfaces used to aim the projector and/or imaging devices at the bottom surface of the optical waveguide.

While a generally planar touch panel 214 has been described, it will be understood that the principles set out above may be applied to create non-planar touch panels or touch panels having multiple intersection planes or facets where total internal reflection of a non- or multi-planar optical waveguide layer is frustrated by compression of a resilient diffusion layer that is against and follows the surface contour of the optical waveguide layer. Examples of non-planar shapes include arcs, semi-circles, or other regular or irregular shapes.

Figure 19:
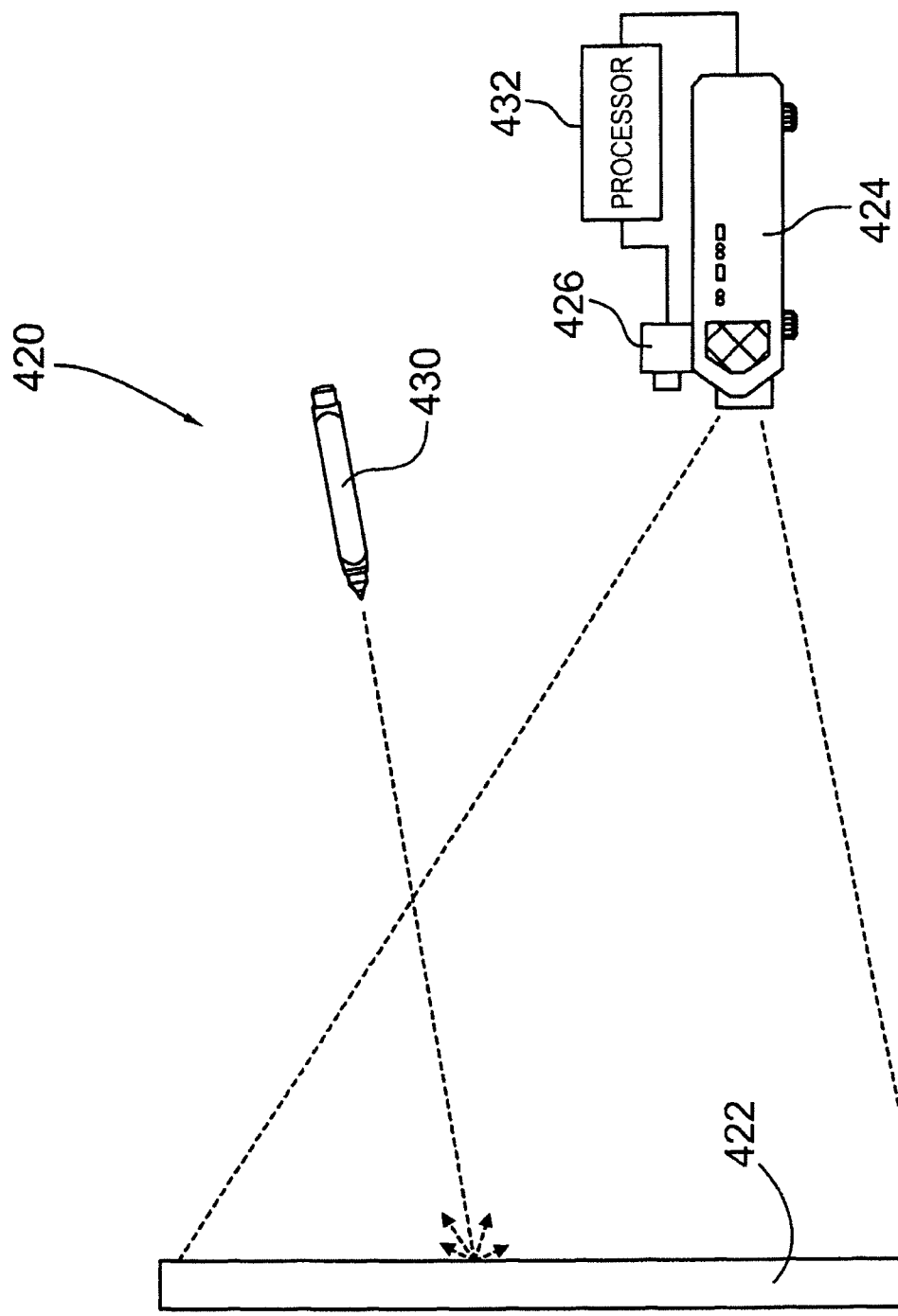
FIG. 19 is a side elevational view of still yet another embodiment of an interactive input system.

Turning now to FIG. 19, yet another embodiment of an interactive input system is shown and is generally identified by reference numeral 420. In this embodiment, interactive input system includes a whiteboard 422 mounted on a wall or other suitable surface. A projector 424 is spaced from the whiteboard 422 and projects an image that is displayed on the front surface of the whiteboard. An imaging device 426 is positioned above the projector 424 and is oriented so that its field of view encompasses the front surface of the whiteboard. A light pen or a laser pointer 430 that emits pulsed radiation is used to interact with the front surface of the whiteboard.

When the imaging device 426 captures image frames of the front surface of the whiteboard 422 and the pointer 430 is being used to interact with the whiteboard 422, image frames captured by the imaging device 426 include bright spots corresponding to the pulsed radiation emitted by the pointer 430. A processor 432 in communication with the imaging device 426 processes the image frames to determine the coordinates of the bright spots and to use the coordinates to update the image data provided to the projector 424, if appropriate. The pointer 430 communicates with the imaging device 426 over a wireless communication channel (e.g. Bluetooth etc.) to synchronize the timing of emitted radiation pulses to the exposure time of the imaging device 426. In this manner, an illumination/exposure scheme similar to that of the previous embodiments is employed. Advantageously, the current level of the pulses powering the light source of the pointer 430 can be increased above the maximum current level for the light source of the pointer 430 under non-pulsed, or constant, operation. The pulses being synchronized to shortened exposure times of the imaging device 426 reduces the amount of ambient light captured but does not decrease the amount of signal light captured, thus increasing the SNR compared to non-pulsed operation.

Although the illumination/exposure balancing scheme has been described with reference to specific interactive input systems, those of skill in the art will appreciate that the illumination/exposure balancing scheme can be employed in other interactive input systems that employ imaging devices and illumination sources.

Furthermore, although the illumination/exposure balancing scheme has been described having an imaging device signal a light source to emit a pulse of radiation during imaging device exposure, alternatives are possible in which the imaging device is preconfigured to be synchronized with the light source pulsing such that continual signaling is not required, or in which the imaging device is signaled to expose and the light source is signaled to emit radiation simultaneously with the exposure, by an external controller. Other alternatives may be contemplated.

In the above-described embodiments, the light sources are described as emitting radiation at an increased intensity determined by a current higher than the normal current. Those of skill in the art will however appreciate that in an alternative embodiment, the light sources may be driven by a normal current, in which case, the light sources are used with image devices having exposure times shorter than the total image capture times to obtain improved signal-to-noise ratios.

Although embodiments have been described with reference to the drawings, those of skill in the art will appreciate that variations and modifications may be made without departing from the spirit and scope thereof as defined by the appended claims.

What is claimed is:

1. An input panel for an interactive input system comprising:
    an optical waveguide;
    a first radiation source that is turned on and off, when on said first radiation source directing radiation into said optical waveguide, said radiation undergoing total internal reflection within said optical waveguide;
    a diffusion layer adjacent to and disposed on one major outer side of the optical waveguide, totally internally reflected radiation within said optical waveguide being frustrated and escaping the optical waveguide in response to one or more pointer contacts on the diffusion layer;
    at least one second radiation source that is turned on and off, when on said at least one second radiation source directing radiation towards an opposite major outer side of the optical waveguide; and
    at least one imaging device having a field of view looking at the opposite major outer side of the optical waveguide and capturing image frames, wherein during image frame capture operation, image frames are captured at least when (i) the first radiation source is on and the at least one second radiation source is off (ii) the first radiation source is off and the at least one second radiation source is on and (iii) the first radiation source is off and the at least one second radiation source off.

2. The input panel of claim 1, wherein said at least one imaging device comprises a first imaging device and a second imaging device, wherein said first imaging device is timed to capture image frames when said first radiation source is on and said at least one second radiation source is off and wherein said second imaging device is timed to capture image frames when said first radiation source is off and said at least one second radiation source is on and when said first radiation source is off and said at least one second radiation source is off.

3. The input panel of claim 2 further comprising processing structure processing the image frames captured by said first and second imaging devices to identify the location of one or more pointer contacts on the diffusion layer.

4. The input panel of claim 3, further comprising a projector receiving image data from said processing structure and projecting images based on said image data for presentation on said diffusion layer.

5. The input panel of claim 4, further comprising an infrared reflective film above the diffusion layer.

6. The input panel of claim 2, wherein the first radiation source directs radiation at a first wavelength and the at least one second radiation source directs radiation at a second wavelength different from the first wavelength.

7. The input panel of claim 6, wherein the processing structure compares image frames captured by the first imaging device with image frames captured by the second imaging device to filter out tracing artifacts.

8. The input panel of claim 1 further comprising processing structure processing the image frames captured by said at least one imaging device to identify the location of one or more pointer contacts on the diffusion layer.

9. The input panel of claim 8, further comprising a projector receiving image data from said processing structure and projecting images based on said image data for presentation on said diffusion layer.

10. The input panel of claim 1, wherein the exposure time of the at least one imaging device is less than a total image frame capture time.

11. The input panel of claim 1, wherein said first and at least one second radiation sources comprise infrared light emitting diodes.

12. The input panel of claim 1, wherein the diffusion layer is a weave material that, when depressed, frustrates the totally internally reflected radiation within the optical waveguide.

13. The input panel of claim 1, wherein the diffusion layer is formed of a projection screen material.

14. The input panel of claim 1, further comprising an infrared reflective film above the diffusion layer.

15. The input panel of claim 1, wherein said at least one imaging device during normal image frame capture operation is timed to capture image frames when the first radiation source is on and the at least one second radiation source is off and wherein when one or more pointer contacts on the diffusion layer are detected, the normal image frame operation is interrupted and image frames are captured by the at least one imaging device with the first radiation source off and the at least one second radiation source on and with the first radiation source off and the at least one second radiation source off.

16. An interactive input system comprising:
at least one Imaging device capturing image frames of a region of interest, wherein the exposure time for each captured image frame is less than a total image frame capture time;
at least first and second radiation sources that are turned on and off, when on each of the at least first and second radiation sources emitting radiation into the region of interest during the exposure time; and
processing structure processing images captured by said at least one imaging device to determine the presence of one or more pointers within the region of interest, wherein during image frame capture operation, image frames are captured at least when (i) the first radiation source is on and the second radiation source is off (ii) the first radiation source is off and the second radiation source is on and (iii) the first radiation source is off and the second radiation source off.

17. The interactive input system of claim 16, wherein the exposure time is 40% of the total image frame capture time.

18. The interactive input system of claim 16, wherein the at least one imaging device comprises a first imaging device and a second imaging device.

19. The interactive input system of claim 18, wherein the processing structure triangulates the position of the one or more pointers using triangulation based on image frames captured by the first and second imaging devices.

20. The interactive input system of claim 18, wherein the first and second radiation sources each comprise a current control module that receives a control signal from a respective one of the first and second imaging devices to emit radiation during respective exposure times.

21. The interactive input system of claim 16, further comprising a projector receiving image data from said processing structure and projecting images based on said image data for presentation on a display surface.

22. The interactive input system of claim 16, further comprising one or more reflective bezel segments associated with the region of interest for reflecting radiation emitted by the first and second radiation sources back to the at least one imaging device.

23. The interactive input system of claim 22, wherein the processing structure detects presence of a pointer within the region of interest based on detecting occlusion of reflected radiation in captured image frames.

24. The interactive input system of claim 16, wherein the processing structure detects presence of one or more pointers within the region of interest based on detecting one or more bright spots corresponding to the pulsed radiation emitted by the one of more pointers.

* * * * *